United States Patent
Cheng et al.

(10) Patent No.: US 12,368,614 B2
(45) Date of Patent: Jul. 22, 2025

(54) ENABLING INTER CARRIER INTERFACE COMPENSATION FOR INTERLEAVED MAPPING FROM VIRTUAL TO PHYSICAL RESOURCE BLOCKS

(71) Applicant: Telefonaktiebolaget LM Ericsson (publ), Stockholm (SE)

(72) Inventors: Jung-Fu Cheng, Fremont, CA (US); Mehrnaz Afshang, Fremont, CA (US); Dennis Hui, Sunnyvale, CA (US); Stephen Grant, Pleasanton, CA (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 122 days.

(21) Appl. No.: 18/248,882

(22) PCT Filed: Oct. 15, 2021

(86) PCT No.: PCT/SE2021/051020
§ 371 (c)(1),
(2) Date: Apr. 13, 2023

(87) PCT Pub. No.: WO2022/081078
PCT Pub. Date: Apr. 21, 2022

(65) Prior Publication Data
US 2023/0396468 A1 Dec. 7, 2023

Related U.S. Application Data
(60) Provisional application No. 63/092,994, filed on Oct. 16, 2020.

(51) Int. Cl.
*H04L 25/03* (2006.01)
*H04L 5/00* (2006.01)
(Continued)

(52) U.S. Cl.
CPC ...... *H04L 25/03821* (2013.01); *H04L 5/0044* (2013.01); *H04L 25/0228* (2013.01); *H04L 27/2602* (2013.01)

(58) Field of Classification Search
CPC ............ H04L 25/03821; H04L 5/0044; H04L 25/0228; H04L 27/2602; H04L 5/0051;
(Continued)

(56) References Cited

U.S. PATENT DOCUMENTS 9,515,687 B2 * 12/2016 Hewavithana ...... H04L 27/2647
2015/0071105 A1 3/2015 Farhang
(Continued)

FOREIGN PATENT DOCUMENTS

| EP | 3179681 A1 | 6/2017 |
|---|---|---|
| WO | 2014051494 A1 | 4/2014 |

(Continued)

OTHER PUBLICATIONS

International Search Report and Written Opinion dated Jan. 11, 2022 for International Application No. PCT/SE2021/051020 filed Oct. 15, 2021; consisting of 9 pages.
(Continued)

*Primary Examiner* — Vineeta S Panwalkar
(74) *Attorney, Agent, or Firm* — Weisberg I.P. Law, P.A.

(57) ABSTRACT

A method, system and apparatus are disclosed for enabling inter carrier interference compensation for interleaved mapping from virtual to physical resource blocks. In one embodiment, a network node is configured to determine to configure the first signal to be located at a subcarrier except at an edge sub-carrier of a resource block, RB; transmit the configuration of the first signal to the WD; and receive a physical uplink shared channel, PUSCH, signaling and the first signal from the WD based at least in part on the determined configuration. In one embodiment, a WD is
(Continued)

configured to perform a de-inter-carrier-interference (de-ICI) filter estimation on a first received signal and a second received signal; apply a de-ICI filter to a third received signal, the de-ICI filter being based on the de-ICI filter estimation; and after the application of the de-ICI filter, de-interleaved map and demodulate the third received signal.

9 Claims, 18 Drawing Sheets

(51) Int. Cl.
*H04L 25/02* (2006.01)
*H04L 27/26* (2006.01)

(58) Field of Classification Search
CPC ... H04L 5/0053; H04L 5/0062; H04L 5/0094; H04L 27/2613
See application file for complete search history.

(56) References Cited

U.S. PATENT DOCUMENTS

| | | |
|---|---|---|
| 2017/0374664 A1 | 12/2017 | Kimura et al. |
| 2019/0044673 A1 | 2/2019 | Maleki et al. |
| 2019/0327043 A1 | 10/2019 | Maleki et al. |
| 2020/0045708 A1 | 2/2020 | Hwang et al. |
| 2022/0109539 A1* | 4/2022 | Zewail ............... H04L 5/0073 |

FOREIGN PATENT DOCUMENTS

| | | |
|---|---|---|
| WO | 2018062874 A1 | 4/2018 |
| WO | 2019030426 A1 | 2/2019 |
| WO | 2019150185 A1 | 8/2019 |

OTHER PUBLICATIONS

Petrovic, D. et al.; Effects of Phase Noise on OFDM Systems With and Without PLL: Characterization and Compensation; IEEE Transactions on Communications, vol. 55, No. 8, Aug. 2007; consisting of 10 pages.

3GPP TS 38.211 V16.3.0; 3rd Generation Partnership Project; Technical Specification Group Radio Access Network; NR; Physical channels and modulation (Release 16); Sep. 2020, consisting of 133 pages.

European Communication and Extended European Search Report dated Nov. 25, 2024 for Application No. 21880670.1, consisting of 11 pages.

* cited by examiner

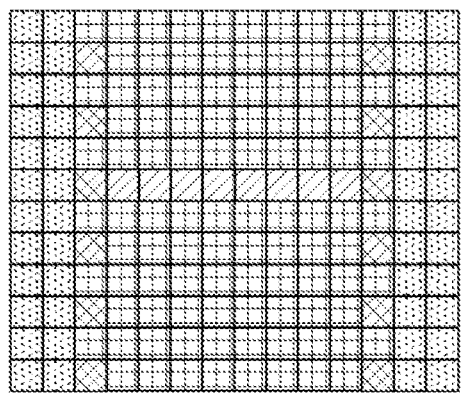
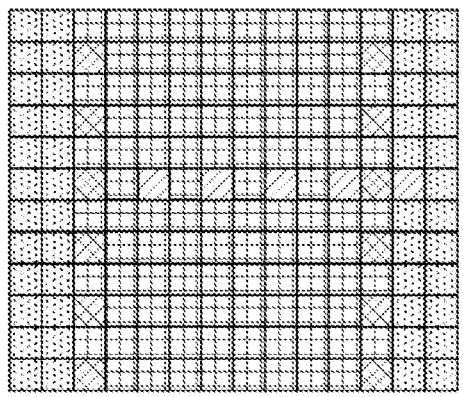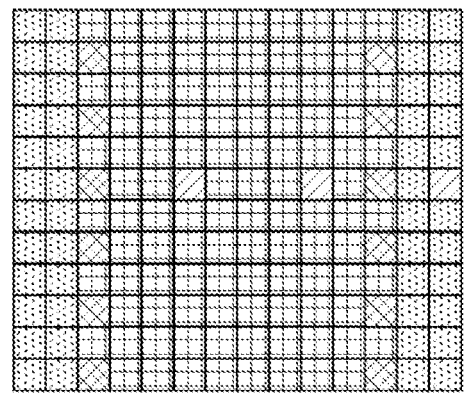
FIG. 4

FIG. 7

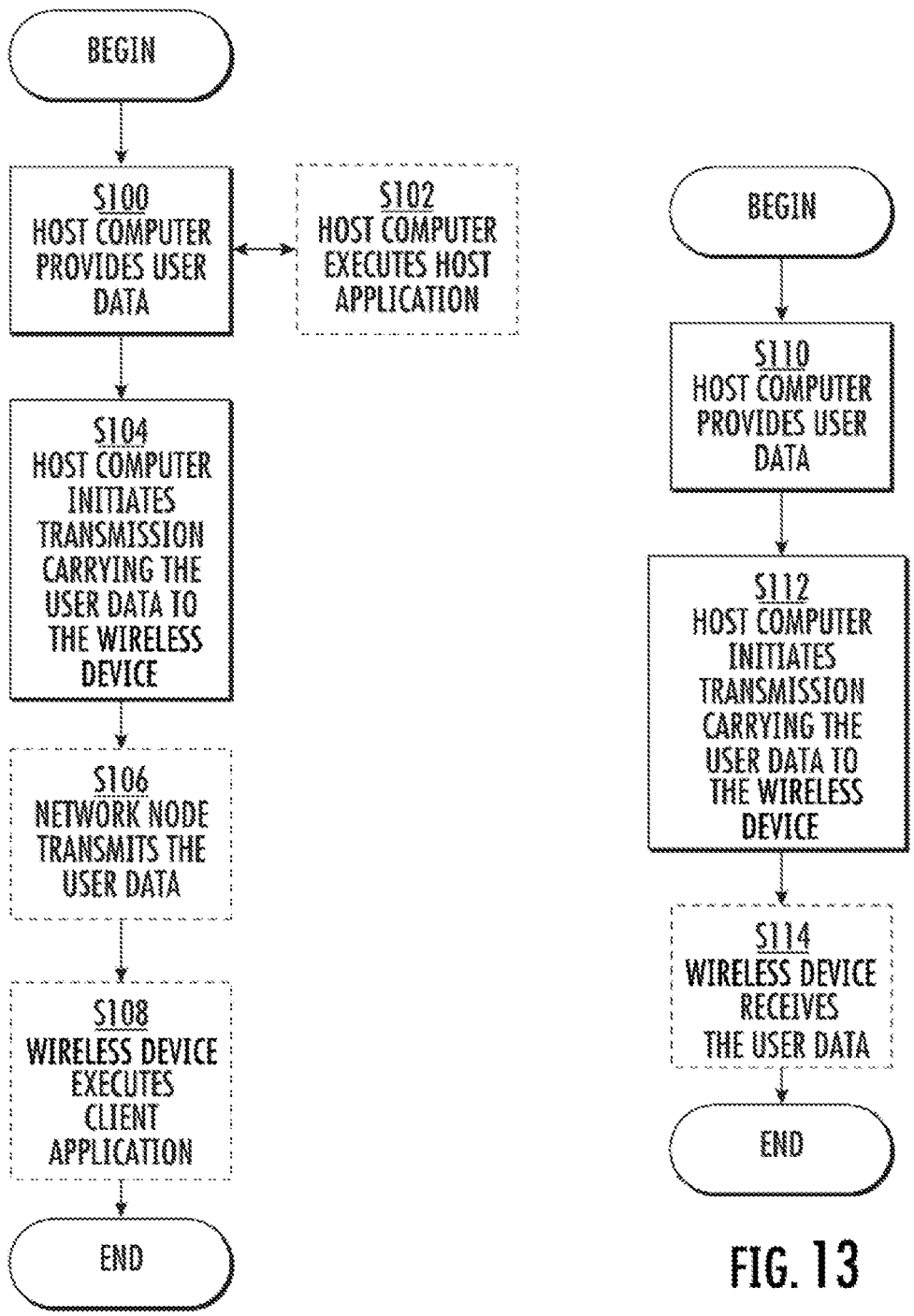

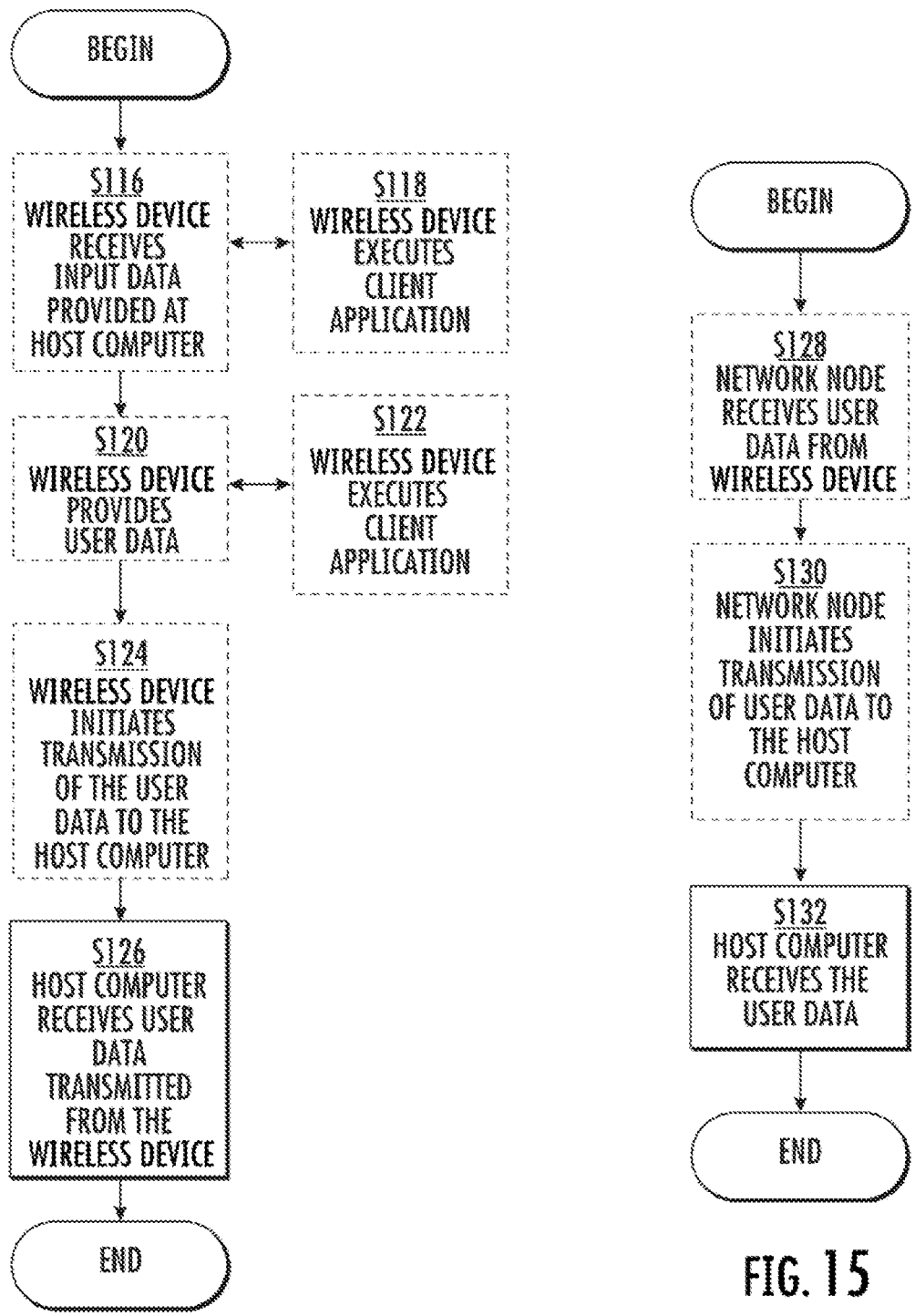

ENABLING INTER CARRIER INTERFACE COMPENSATION FOR INTERLEAVED MAPPING FROM VIRTUAL TO PHYSICAL RESOURCE BLOCKS

CROSS-REFERENCE TO RELATED APPLICATIONS

This application is a Submission Under 35 U.S.C. § 371 for U.S. National Stage Patent Application of International Application No.: PCT/SE2021/051020, filed Oct. 15, 2021 entitled "ENABLING INTER CARRIER INTERFACE COMPENSATION FOR INTERLEAVED MAPPING FROM VIRTUAL TO PHYSICAL RESOURCE BLOCKS," which claims priority to U.S. Provisional Application No. 63/092,994, filed Oct. 16, 2020, entitled "ENABLING INTER CARRIER INTERFERENCE COMPENSATION FOR INTERLEAVED MAPPING FROM VIRTUAL TO PHYSICAL RESOURCE BLOCKS," the entireties of both of which are incorporated herein by reference.

FIELD

The present disclosure relates to wireless communications, and in particular, to enabling inter carrier interference compensation for interleaved mapping from virtual to physical resource blocks.

BACKGROUND

Mobile broadband will continue to drive the demands for big overall traffic capacity and huge achievable end-user data rates in the wireless access network. Several scenarios in the future may require data rates of up to 10 Gigabits per second (Gbps) in local areas. These demands for very high system capacity and very high end-user date rates can be met by networks with distances between access nodes ranging from a few meters in indoor deployments up to roughly 50 meters (m) in outdoor deployments, i.e., with an infrastructure density considerably higher than the densest networks of today.

In $3^{rd}$ Generation Partnership Project (3GPP) Release 15 (Rel-15), a $5^{th}$ Generation system (5G), also referred to as New Radio (NR), was specified. NR standard in 3GPP is designed to provide services for multiple use cases such as enhanced mobile broadband (eMBB), ultra-reliable and low latency communication (URLLC), and machine type communication (MTC). Each of these services has different technical requirements. For example, the general requirement for eMBB is high data rate with moderate latency and moderate coverage, while URLLC service requires a low latency and high reliability transmission but perhaps for moderate data rates.

Besides traditional licensed exclusive bands, NR systems are currently being extended expected to operate on unlicensed bands. The NR system specifications currently address two frequency ranges (FR1 and FR2), which are summarized in Table 1 below. To support ever growing mobile traffic, further extension of the NR system to support spectrum higher than 5.26 GHz is expected in the near future.

TABLE 1

Frequency ranges.

| Frequency range designation | Corresponding frequency range |
|---|---|
| FR1 | 410 MHz-7125 MHz |
| FR2 | 24250 MHz-52600 MHz |

Overview of Rel-15 Nr System

Numerology and Bandwidth Consideration for NR

The downlink transmission waveform in NR is conventional orthogonal frequency division multiplexing (OFDM) using a cyclic prefix (CP). The basic transmitter block diagram for NR is illustrated in FIG. 1.

Multiple numerologies are supported in NR. A numerology is defined by sub-carrier spacing and CP overhead. Multiple subcarrier spacings (SCS) can be derived by scaling a basic subcarrier spacing by an integer $2^\mu$. The numerology used can be selected independently of the frequency band although it is assumed not to use a very small subcarrier spacing at very high carrier frequencies. Flexible network and wireless device (WD, also called user equipment or UE for short) channel bandwidths are supported. The supported transmission numerologies in NR are summarized in Table 2 below.

TABLE 2

Transmission numerologies supported in NR.

| $\mu$ | $\Delta f = 2^\mu \cdot 15[kHz]$ | Cyclic prefix | Supported for data | Supported for synch |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

From radio access network open systems interconnect layer 1 (RAN1) specification perspective, maximum channel bandwidth per NR carrier is 400 MHz in Rel-15. At least for single numerology case, candidates of the maximum number of subcarriers per NR carrier is 3300 in Rel-15 from RAN1 specification perspective.

Downlink and uplink transmissions are organized into frames with 10 millisecond (ms) duration, including ten 1 ms subframes. Each frame is divided into two equally-sized half-frames of five subframes each. The slot duration is 14 symbols with Normal CP and 12 symbols with Extended CP, and scales in time as a function of the used sub-carrier spacing so that there is always an integer number of slots in a subframe. More specifically, the number of slots per subframe is $2^\mu$.

The basic NR downlink physical resource within a slot can thus be seen as a time-frequency grid as illustrated in FIG. 2 for 15 kHz sub-carrier spacing numerology, where each resource element corresponds to one OFDM subcarrier during one OFDM symbol interval. A resource block is defined as 12 consecutive subcarriers in the frequency domain. The uplink subframe has the same subcarrier spacing as the downlink and the same number of single-carrier frequency division multiple access (SC-FDMA) symbols in the time domain as OFDM symbols in the downlink.

Consideration for Extended NR to Higher Frequency Range

For extending NR operation in frequencies above 52.6 GHz, several challenges such as designing a low complexity algorithm for phase noise (PN) compensation are to be addressed.

Phase Noise

Oscillators are important elements of transmitters and receivers in wireless systems. A main function of oscillators is to up-convert a base-band signal to a radio-frequency signal at the transmitter and down-convert a radio-frequency signal to a base-band signal at the receiver. Ideally, an oscillator generates a perfect sinusoidal signal with frequency $f_0$. In practical situations, the signal generated by oscillators is not perfect and has low random fluctuations in the phase, which are usually called phase noise. An oscillator with a central frequency $f_0$ and the effects of phase noise can be modelled as $$V(t)=\exp(j(2\Pi t f_0+\phi(t))),$$

in which $\phi(t)$ is a stochastic process that modifies the phase of the ideal sinusoidal signal, called phase noise. The level of the generated PN is dependent on the carrier frequency. That is, the higher the carrier frequency, the higher the level of PN. For every doubling of the carrier frequency, the level of phase noise approximately increases by 6 dB. In OFDM signals, the impact of PN is observed as common phase error (CPE), which introduces a multiplicative phase distortion that is common across all sub-carriers, and as inter-carrier interference (ICI), which results from the loss of orthogonality between sub-carriers. The impact of PN on system performance can be sufficiently mitigated by applying CPE correction algorithms in FR1 and FR2, however, for extending NR operation to above 52.6 GHz, ICI begins to dominate and therefore will require application of appropriate ICI suppression algorithms.

Let the transmitted symbol and the channel response for sub-carrier k be $S_k$ and $H_k$, respectively. The time-varying phase noise induces inter-carrier-interference (ICI) in the received signal $R_k$:

$$R_k = \sum_i J_i H_{k-i} S_{k-i} + W_k.$$

The taps of the true ICI filter $\{J_i\}$ are unknown to the receiver and is to be estimated.

NR Rel-16 Phase Tracking Reference Signal (PTRS)

The existing NR 3GPP Release 16 (Rel-16) Phase Tracking Reference Signal (PTRS) is a WD-specific reference signal (RS) which aims for phase rotation estimation and compensation. PTRS is designed with various time and frequency density and is mapped across the bandwidth part (BWP) allocated to a WD. Since CPE from PN is common across all the sub-carriers in an OFDM symbol while varying across time from symbol to symbol, typically, PTRS has lower density in frequency, as illustrated in FIG. 3 (NR PTRS corresponding to darker shading) for example, but may have higher density in time.

Examples of the various of PTRS patterns together with different TYPE-1 demodulation reference signals (DMRS) patterns are shown in FIG. 4. The time densest PTRS pattern is one where all OFDM symbols are mapped with PTRS while the time sparsest PTRS mapping is when PTRS is mapped on every $4^{th}$ OFDM symbol. Similarly, the densest PTRS frequency mapping is every $2^{nd}$ PRB while the sparsest is every $4^{th}$ PRB. The faster the PN changes across OFDM symbol, the denser PTRS time mapping is used. At very high frequencies, e.g., in the 52.6-71 GHz band, the PN is expected to vary significantly from one OFDM symbol to the next. In fact, one cannot guarantee the time continuity of phase noise effects across OFDM symbols, precluding the use of interpolation between OFDM symbols based on the time-spare PTRS patterns. High time-density is needed in this case, e.g., every OFDM symbol.

PTRS is configurable depending on the quality of the oscillators, carrier frequency, OFDM subcarrier spacing, and modulation and coding schemes used for transmission.

Phase Noise Compensation Algorithm

In this section, a brief overview of ICI compensation algorithm is provided. Let the transmitted symbol and the channel response for sub-carrier k be $S_k$ and $H_k$, respectively. The time-varying phase noise induces inter-carrier-interference (ICI) in the received signal $R_k$:

$$R_k = \sum_i J_i H_{k-i} S_{k-i} + W_k.$$

Let $K=\{k_0, k_1, \ldots, k_{N-1}\}$ denote the index set of subcarriers that PTRS are transmitted on. The values of $S_k$ at these sub-carriers are hence known and can be used to estimate a de-ICI filter of $2u+1$ taps such that the filter output is relatively free of ICI:

$$\sum_{m=-u}^{u} a_m R_{k-m} \approx H_k S_k \text{ for } k \in \{k_0, k_1, \cdots, k_{N-1}\}.$$

Note that there are N equations in the above regardless of the value of u.

To proceed with estimating the de-ICI filter, the matrix and vector notation may be defined. First, the $R_u$ matrix collects the received signals at and around the PTRS:

$$R_u \triangleq \begin{bmatrix} R_{k_0+u} & R_{k_0+u-1} & \cdots & R_{k_0-u} \\ R_{k_1+u} & R_{k_1+u-1} & \cdots & R_{k_1-u} \\ \vdots & \vdots & \ddots & \vdots \\ R_{k_{N-1}+u} & R_{k_{N-1}+u-1} & \cdots & R_{k_{N-1}-u} \end{bmatrix}.$$

The de-ICI filter coefficients are collected into a vector a:

$$a \triangleq \begin{bmatrix} a_{-u} \\ a_{-u+1} \\ \vdots \\ a_u \end{bmatrix}.$$

The values of $H_k S_k$ at the PTRS subcarrier locations $k \in \{k_0, k_1, \ldots, k_{N-1}\}$ are known, and given by products of the estimated channel coefficients and the PTRS symbol values. These are collected into the vector x as follows:

$$x \triangleq \begin{bmatrix} H_{k_0} S_{k_0} \\ \vdots \\ H_{k_{N-1}} S_{k_{N-1}} \end{bmatrix}.$$

For ICI compensation, the (2u+1)-tap de-ICI filter can be obtained from minimizing the residue sum of squares: $\|R_u a_u - x\|^2$. A solution to this least square problem may be expressed as:

$$\hat{a}_u \triangleq (R_u^H R_u)^{-1} R_u^H x.$$

Note that $R_u^H R_u$ is a (2u+1)×(2u+1) matrix. In practice, very good ICI has been found for compensation performance using u=1, in which case $R_u^H R_u$ is a small 3×3 matrix.

To compensate the ICI, the received signal samples in the frequency domain $\{R_k\}$ may be filtered by $\{\hat{a}_{-u}, \hat{a}_{-u+1}, \ldots, \hat{a}_u\}$:

$$R_k' \triangleq \sum_{m=-u}^{u} \hat{a}_m R_{k-m}.$$

The filtered signal $R_k'$ can then be fed to the OFDM demodulator. A simplified block diagram of a transmitter-receiver (Tx-Rx) chain with PN compensation is shown in FIG. 5.

Mapping From Virtual to Physical Resource Blocks

There are two methods for mapping virtual resource blocks to physical resource blocks, non-interleaved mapping (FIG. 6: top) and interleaved mapping (FIG. 6: bottom).

Non-Interleaved Mapping

Non-interleaved mapping means that a virtual resource block in a bandwidth part maps directly to the physical resource block in the same bandwidth part. This is useful in cases when the network tries to allocate transmissions to physical resource with instantaneously favorable channel conditions. In Rel-15, non-interleaved mapping is the only option for the UL.

Interleaved Mapping

Interleaved mapping maps virtual resource blocks to physical resource blocks using an interleaver spanning the whole bandwidth part and operating on pairs or quadruplets of resource blocks. A block interleaver with two rows is used, with pairs/quadruplets of resource blocks written column-by-column and read out row by-row. Whether to use pairs or quadruplets of resource blocks in the interleaving operation is configurable by higher-layer signaling. In Rel-15, interleaved mapping is supported for the DL only.

A reason for interleaved resource-block mapping is to achieve frequency diversity, the benefits of which can be motivated separately for small and large resource allocations.

For small allocations, for example voice services, channel-dependent scheduling may not be motivated from an overhead perspective due to the amount of feedback signaling required or may not be possible due to channel variations not being possible to track for a rapidly moving device. Frequency diversity by distributing the transmission in the frequency domain is in such cases an alternative way to exploit channel variations. Although frequency diversity could be obtained by using resource allocation type 0 (see FIG. 7, e.g., allocated resources are indicated by shading), this resource allocation scheme implies a relatively large control signaling overhead compared to the data payload transmitted as well as limited possibilities to signal very small allocations. Instead, by using the more compact resource allocation type 1, which is only capable of signaling contiguous resource allocations, combined with an interleaved virtual to physical resource block mapping, frequency diversity can be achieved with a small relative overhead. This is very similar to the distributed resource mapping in LTE. Since resource allocation type 0 can provide a high degree of flexibility in the resource allocation, interleaved mapping is supported for resource allocation type 1 only.

For larger allocations, possibly spanning the whole bandwidth part, frequency diversity can still be advantageous. In the case of a large transport block, that is, at very high data rates, the coded data are split into multiple code blocks as shown in FIG. 8. Mapping the coded data directly to physical resource blocks in a frequency-first manner would result in each code block occupying only a fairly small number of contiguous physical resource blocks. Hence, if the channel quality varies across the frequency range used for transmission, some code blocks may suffer worse quality than other code blocks, possibly resulting in the overall transport block failing to decode despite almost all code blocks being correctly decoded. The quality variations across the frequency range may occur even if the radio channel is flat due to imperfections in radio frequency (RF) components. If an interleaved resource-block mapping is used, one code block occupying a contiguous set of virtual resource blocks would be distributed in the frequency domain across multiple, widely separated physical resource blocks, similarly to what is the case for the small allocations discussed in the previous paragraph. The result of the interleaved VRB-to-PRB mapping is a quality-averaging effect across the code blocks, resulting in a higher likelihood of correctly decoding very large transport blocks.

Interlaced Mapping

FIG. 9 illustrates an additional resource allocation type (Type 2) introduced in Rel-16, which is referred to as interlaced mapping. This is specified for the UL only (not DL) for both cyclic-prefix orthogonal frequency division multiplexing (CP-OFDM) and discrete Fourier transform spread OFDM (DFT-s-OFDM) for the case of 15 and 30 kHz SCS. The diagram shows the case of 30 kHz subcarrier spacing (SCS) for which 5 interlaces are defined. The resource blocks (RBs) corresponding to each of the interlaces are indicated by different shading. For the case of 30 kHz SCS, a length-5 bitmap indicates which interlaces are allocated to the WD. In the example shown here, the bitmap indicates that interlaces 0 and 2 are allocated. This resource allocation type does not support interleaved VRB-to-PRB mapping since the mapping itself is already distributed in the frequency domain.

SUMMARY

Some embodiments advantageously provide methods, systems, and apparatuses for enabling inter carrier interference compensation for interleaved mapping from virtual to physical resource blocks. Some embodiments also provide arrangements for configuring transmission using resource allocation type 2. These arrangements and embodiments advantageously compensate for and/or mitigate the effects of intercarrier interference that can be caused by phase noise or other channel impairments.

In one embodiment, a network node is configured to perform a de-inter-carrier-interference (de-ICI) filter estimation on a first received signal; apply a de-ICI filter to a second received signal, the de-ICI filter based on the de-ICI filter estimation; and after the application of the de-ICI filter, de-map at least one physical resource block (PRB) associated with the second received signal to at least one virtual resource block (VRB) and demodulate the de-mapped second received signal.

In one embodiment, a wireless device (WD) is configured to perform a de-inter-carrier-interference (de-ICI) filter estimation on a first received signal; apply a de-ICI filter to a second received signal, the de-ICI filter based on the de-ICI filter estimation; and after the application of the de-ICI filter, de-map at least one physical resource block (PRB) associated with the second received signal to at least one virtual resource block (VRB) and demodulate the de-mapped second received signal.

According to an aspect of the present disclosure, a method implemented in a wireless device, WD, configured to communicate with a network node is provided. The method comprises performing a de-inter-carrier-interference, de-ICI, filter estimation on a first received signal and a second received signal; applying a de-ICI filter to a third received signal, the de-ICI filter being based on the de-ICI filter estimation that is performed on the first and second received signals; and after the application of the de-ICI filter, de-interleaved mapping at least one physical resource block, PRB, associated with the third received signal to at least one other resource block, RB, and demodulating the third received signal.

In some embodiments, the first received signal comprises a phase tracking reference signal, PTRS, received by the WD. In some embodiments, the method further includes receiving a configuration for the PTRS to be located at a subcarrier except at an edge subcarrier of a resource block, RB. In some embodiments, the second received signal comprises a physical downlink shared channel, PDSCH, signaling that is adjacent to the subcarrier of the PTRS. In some embodiments, the third received signal comprises a physical downlink shared channel, PDSCH, signaling. In some embodiments, the de-interleaved mapping comprises mapping from physical resource blocks, PRBs, to virtual resource blocks, VRBs.

According to an aspect of the present disclosure, a method implemented in a network node configured to communicate with a wireless device, WD, is provided. The method comprises determining to configure a first signal to be located at a subcarrier except at an edge subcarrier of a resource block, RB; transmitting the configuration of the first signal to the WD; and receiving a physical uplink shared channel, PUSCH, signaling and the first signal from the WD based at least in part on the determined configuration.

In some embodiments, the first signal comprises a phase tracking reference signal, PTRS, received by the network node. In some embodiments, the PUSCH signaling is in a subcarrier that is adjacent to the subcarrier of the PTRS. In some embodiments, the PUSCH signaling is configured with one of a frequency domain resource allocation Type 0 and Type 2. In some embodiments, the determining to configure the first signal to be located at the subcarrier except at the edge subcarrier of the RB comprises determining at least one of a demodulation reference signal, DMRS, port number and a resource element offset to configure the subcarrier location of the PTRS within the RB, $k_{ref}^{RE}$, to be unequal to an edge subcarrier location within the RB. In some embodiments, the edge subcarrier location within the RB corresponds to $k_{ref}^{RE}$ of 0 or 11. In some embodiments, the determining to configure the first signal to be located at the subcarrier except at the edge subcarrier is based at least in part on a demodulation reference signal, DMRS, configuration type used for the first signal.

According to yet another aspect, a wireless device, WD, configured to communicate with a network node is provided. The WD comprises processing circuitry. The processing circuitry is configured to cause the WD to perform a de-inter-carrier-interference, de-ICI, filter estimation on a first received signal and a second received signal; apply a de-ICI filter to a third received signal, the de-ICI filter being based on the de-ICI filter estimation that is performed on the first and second received signals; and after the application of the de-ICI filter, de-interleaved map at least one physical resource block, PRB, associated with the third received signal to at least one other resource block, RB, and demodulating the third received signal.

In some embodiments, the first received signal comprises a phase tracking reference signal, PTRS, received by the WD. In some embodiments, the processing circuitry is configured to cause the WD to receive a configuration for the PTRS to be located at a subcarrier except at an edge subcarrier of a resource block, RB. In some embodiments, the second received signal comprises a physical downlink shared channel, PDSCH, signaling that is adjacent to the subcarrier of the PTRS. In some embodiments, the third received signal comprises a physical downlink shared channel, PDSCH, signaling. In some embodiments, the de-interleaved mapping comprises mapping from physical resource blocks, PRBs, to virtual resource blocks, VRBs.

According to yet another aspect, a network node configured to communicate with a wireless device, WD, is provided. The network node comprises processing circuitry. The processing circuitry is configured to cause the network node to determine to configure a first signal to be located at a subcarrier except at an edge subcarrier of a resource block, RB; transmit the configuration of the first signal to the WD; and receive a physical uplink shared channel, PUSCH, signaling and the first signal from the WD based at least in part on the determined configuration.

In some embodiments, the first signal comprises a phase tracking reference signal, PTRS, received by the network node. In some embodiments, the PUSCH signaling is in a subcarrier that is adjacent to the subcarrier of the PTRS. In some embodiments, the PUSCH signaling is configured with one of a frequency domain resource allocation Type 0 and Type 2. In some embodiments, the processing circuitry is configured to cause the network node to determine to configure the first signal to be located at the subcarrier except at the edge subcarrier of the RB by being configured to cause the network node to determine at least one of a demodulation reference signal, DMRS, port number and a resource element offset to configure the subcarrier location of the PTRS within the RB, $k_{ref}^{RE}$, to be unequal to an edge subcarrier location within the RB. In some embodiments, the edge subcarrier location within the RB corresponds to $k_{ref}^{RE}$ of 0 or 11. In some embodiments, the processing circuitry configured to cause the network node to determine to configure the first signal to be located at the subcarrier except at the edge subcarrier based at least in part on a demodulation reference signal, DMRS, configuration type used for the first signal.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 4 illustrates an example of PTRS with 1+1 DMRS (2 DMRS symbols) mapping in NR;

Figure 7:
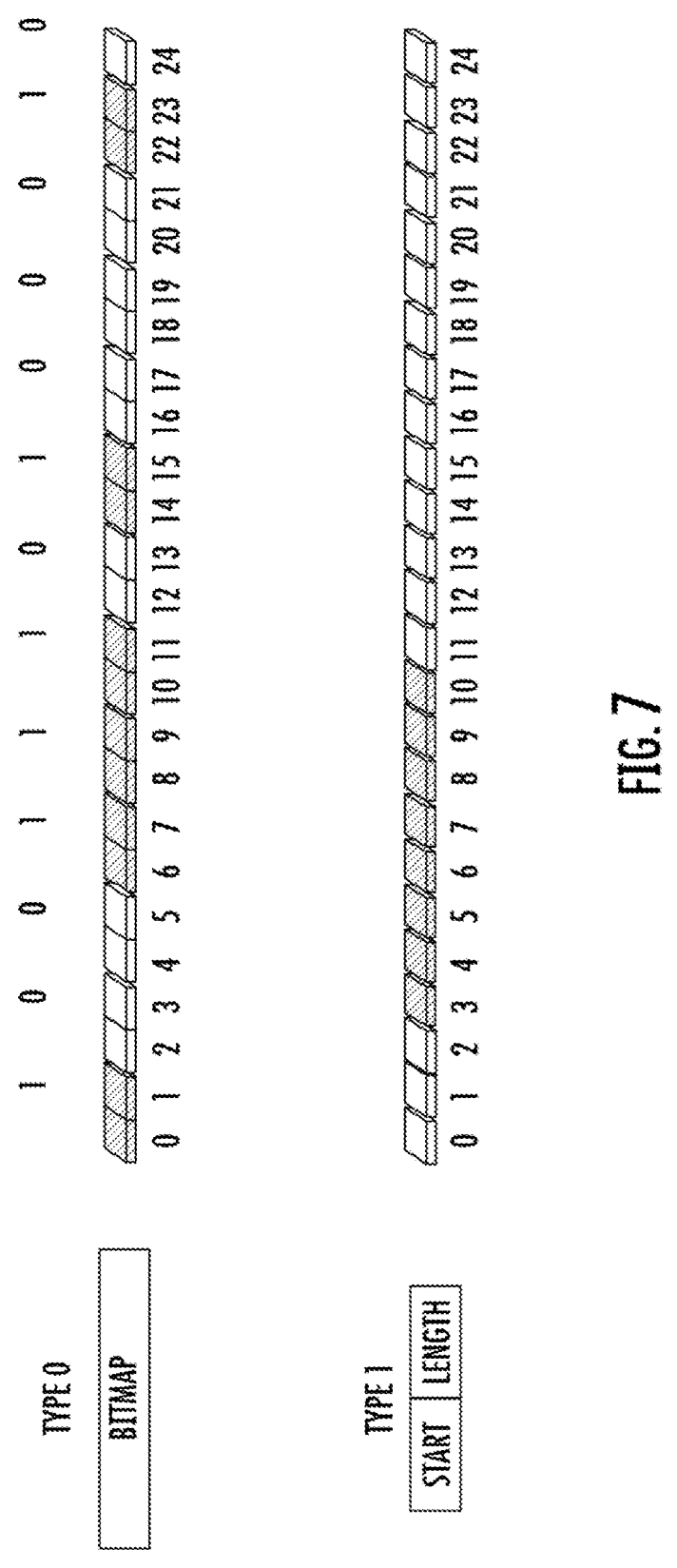

FIG. 7 illustrates an example of resource-block allocation Type 0 and Type 1 (a bandwidth part of 25 resource blocks is used in this example);

FIG. 12 is a flowchart illustrating exemplary methods implemented in a communication system including a host computer, a network node and a wireless device for executing a client application at a wireless device according to some embodiments of the present disclosure;

FIG. 13 is a flowchart illustrating exemplary methods implemented in a communication system including a host computer, a network node and a wireless device for receiving user data at a wireless device according to some embodiments of the present disclosure;

FIG. 14 is a flowchart illustrating exemplary methods implemented in a communication system including a host computer, a network node and a wireless device for receiving user data from the wireless device at a host computer according to some embodiments of the present disclosure;

FIG. 15 is a flowchart illustrating exemplary methods implemented in a communication system including a host computer, a network node and a wireless device for receiving user data at a host computer according to some embodiments of the present disclosure;

DETAILED DESCRIPTION

For extending NR operation above 52.6 GHz, full phase noise compensation (i.e., CPE and ICI compensation) is desirable. As discussed above, for ICI compensation, the received signal $\{R_k\}$ is filtered by de-ICI filter and then fed to the OFDM demodulator, i.e., $R_k' = \Sigma_{m=-u}^{u} a_m R_{k-m}$, where $\{â_{-u}, â_{-u+1}, \ldots, â_u\}$ are coefficients of de-ICI filter. To proceed with estimating the de-ICI filter, it is required to collect the received signals at and around the PTRS. Formally, the $R_u$ matrix, which is collection of the received signals at and around the PTRS, is defined as:

$$R_u \triangleq \begin{bmatrix} R_{k_0+u} & R_{k_0+u-1} & \cdots & R_{k_0-u} \\ R_{k_1+u} & R_{k_1+u-1} & \cdots & R_{k_1-u} \\ \vdots & \vdots & \ddots & \vdots \\ R_{k_{N-1}+u} & R_{k_{N-1}+u-1} & \cdots & R_{k_{N-1}-u} \end{bmatrix}.$$

Each row of the $R_u$ matrix collects the received PTRS $R_{k_i}$ and its adjacent received signals $R_{k_i-u}$ to $R_{k_i+u}$ in the adjacent subcarriers. For interleaved mapping from virtual to physical resource blocks (PRBs), the adjacent received signal to PTRS will be rearranged after de-interleaving, which makes ICI compensation challenging.

Furthermore, if a PTRS is located in the first or the last subcarrier of an RB, then one of its adjacent subcarriers will fall outside of the allocated resources for this physical uplink shared channel (PUSCH). It is further noted such adjacent subcarriers can be allocated as the resource for another network node's PUSCH transmission. Since different network nodes will have different and independent phase noise realizations, adjacent subcarriers outside of the allocated transmissions resources cannot be incorporated in the de-ICI filter estimation without additional processing or handling.

Figure 1:
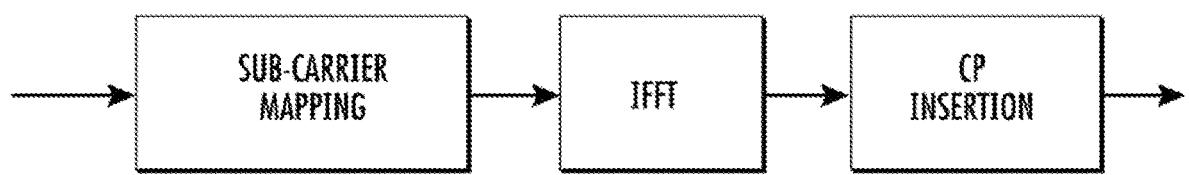
FIG. 1 illustrates an example NR transmitter block diagram for CP-OFDM with optional DFT-spreading.
Figure 2:
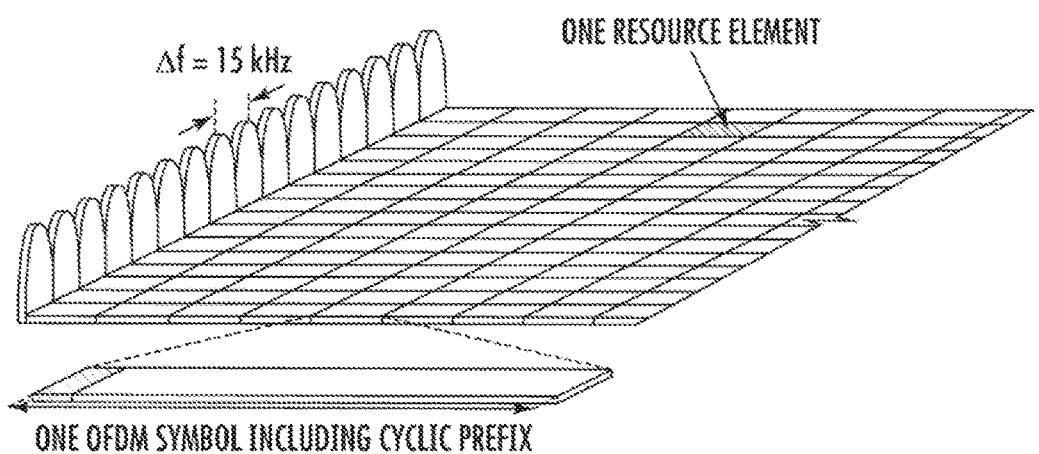
FIG. 2 illustrates an example NR downlink physical resource for 15 kHz sub-carrier spacing numerology.
Figure 3:
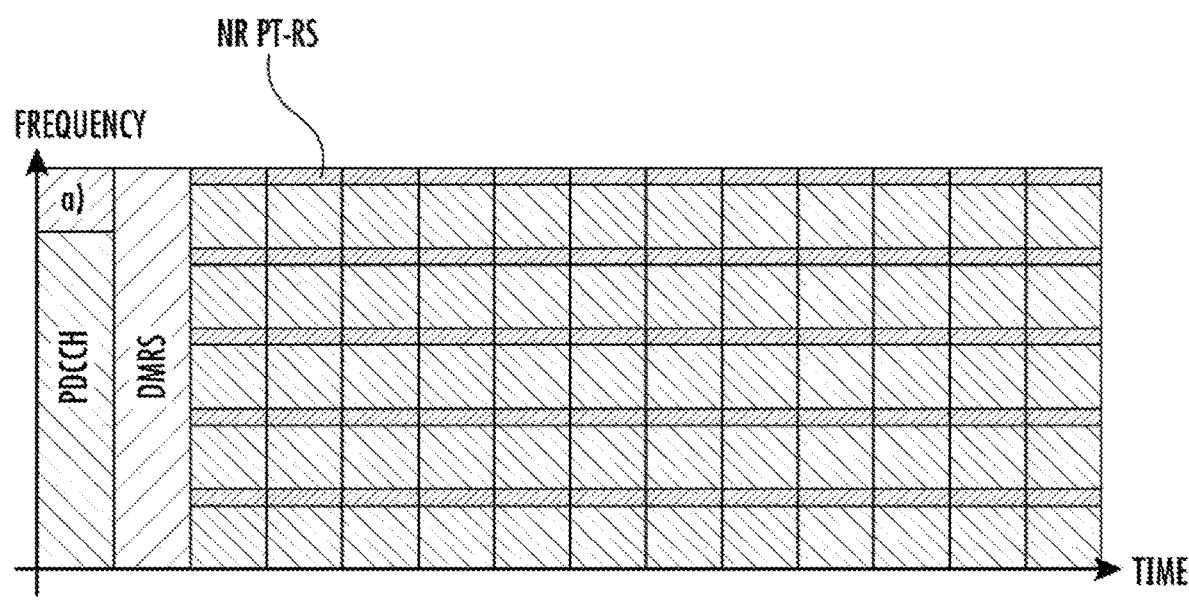
FIG. 3 illustrates an example in which NR PTRS are distributed in frequency domain (dark shaded symbols)
Figure 5:
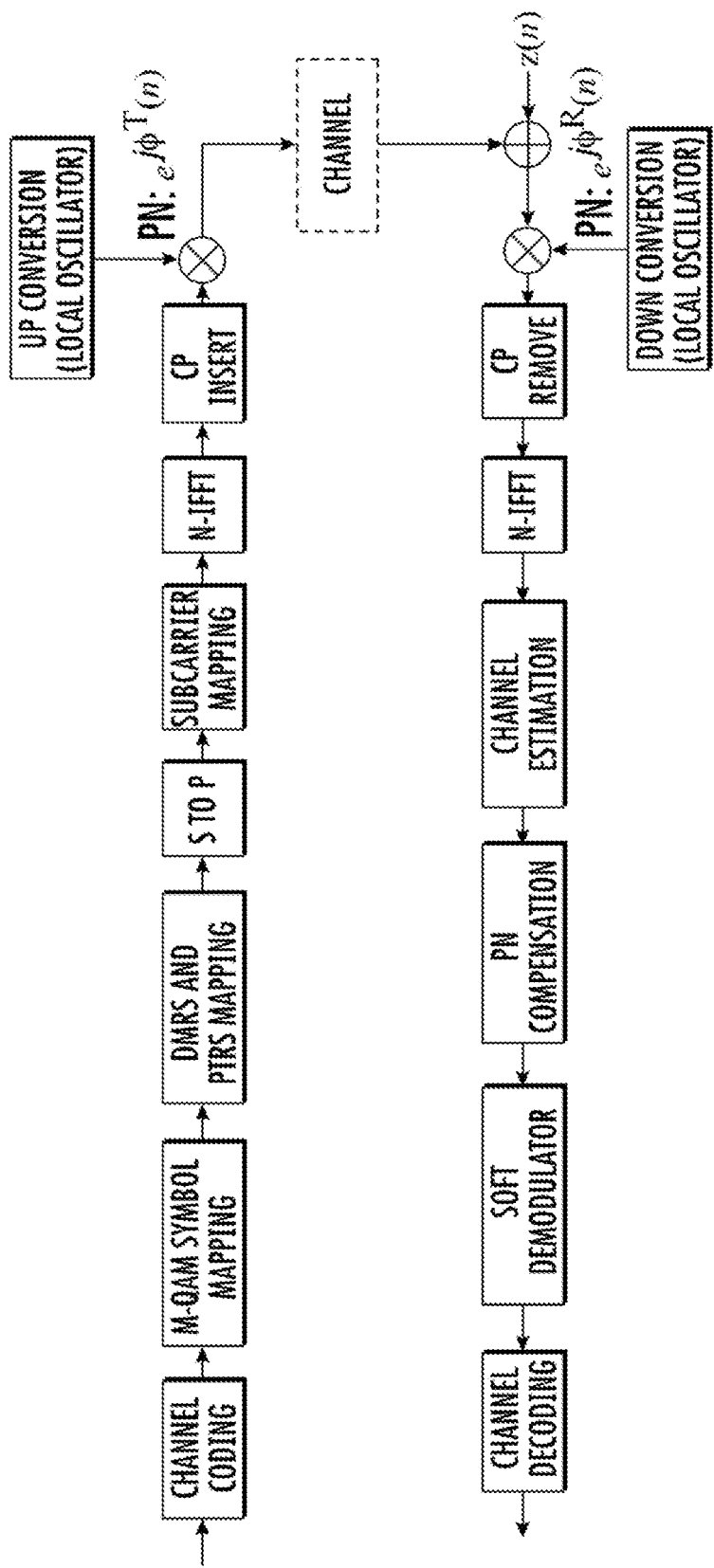
FIG. 5 illustrates an example simplified block diagram of a Tx-Rx chain.
Figure 6:
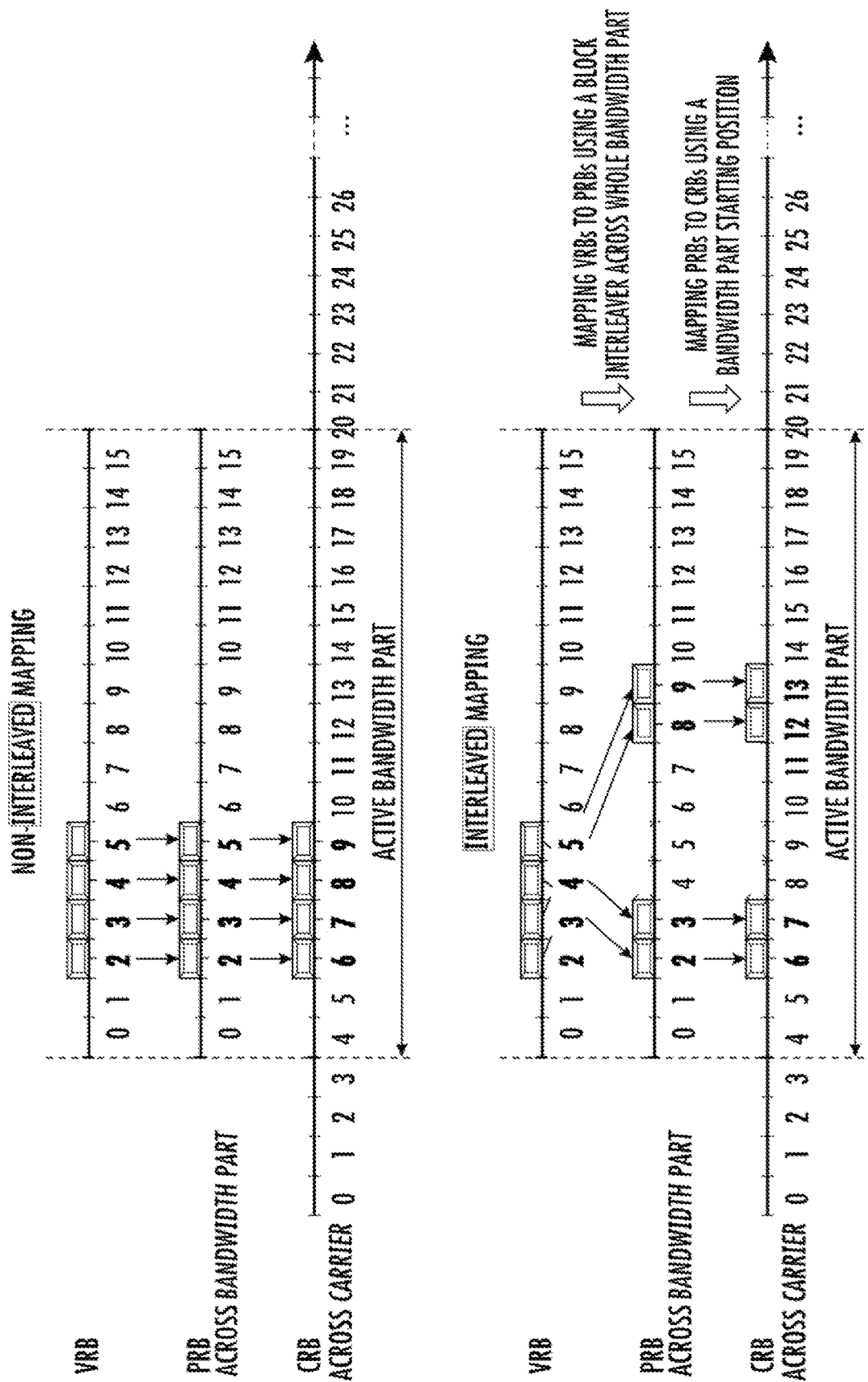
FIG. 6 illustrates an example mapping from virtual to physical to common resource blocks.
Figure 8:
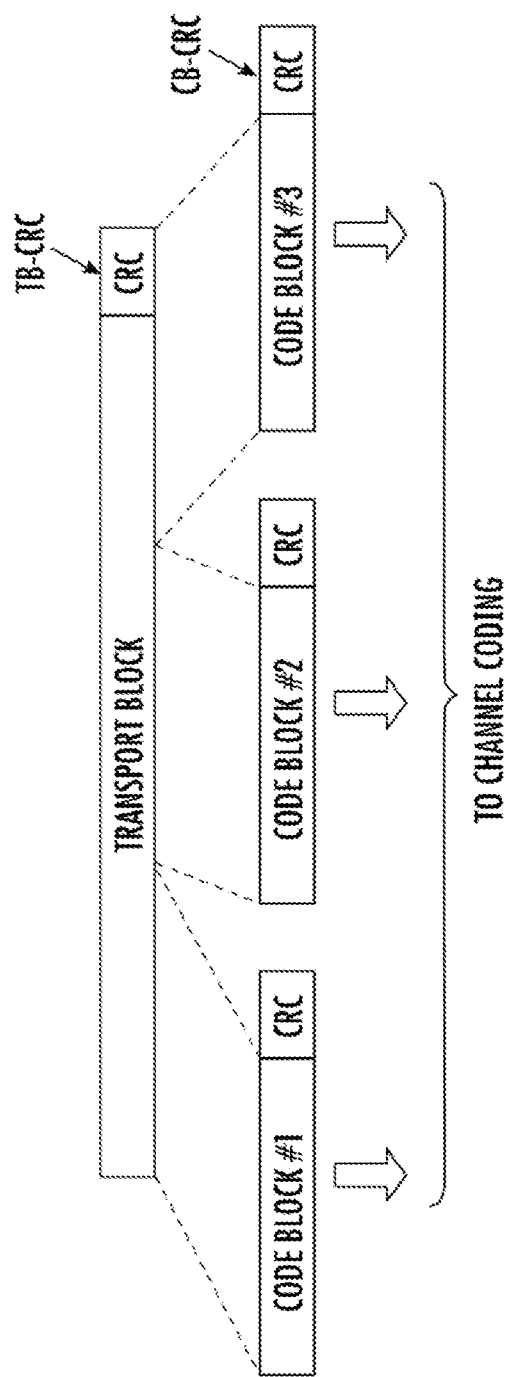
FIG. 8 illustrates an example code block segmentation.
Figure 9:
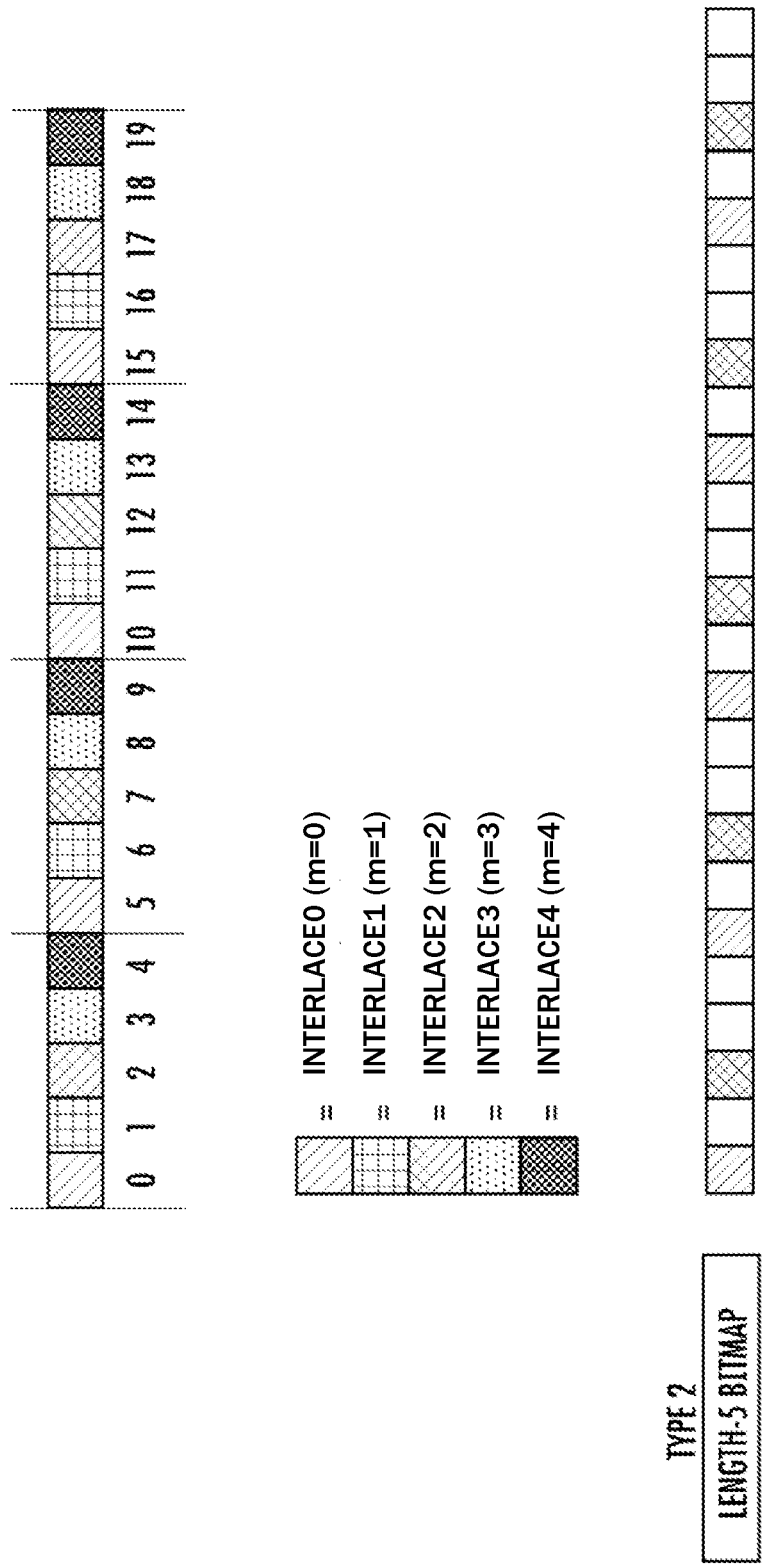
FIG. 9 illustrates an example of resource-block allocation Type 2 (interlaced mapping)

Such kind of edge PTRS issues are particularly prominent with resource allocation type 2 when only one or nonconsecutive interlaces are allocated to a transmission. As a nonlimiting example, the bottom of FIG. 9 shows a transmission case with interlace #0 and #2. It can be observed all the allocated RBs are hence nonconsecutive and, if all PTRS are located at the edge of the RBs, the quality of the de-ICI filter estimation will be negatively impacted.

Some embodiments of the present disclosure provide a method of enabling ICI compensation for interleaved VRB-to-PRB mapping.

Before describing in detail exemplary embodiments, it is noted that the embodiments reside primarily in combinations of apparatus components and processing steps related to enabling inter carrier interference compensation for interleaved mapping from virtual to physical resource blocks. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

The term "adjacent" used herein in the context of a particular signal being adjacent to another signal may mean that the particular signal is within a RB and the other signal is adjacent to subcarriers allocated to the particular signal in that RB. For example "PUSCH signaling adjacent to PTRS" may mean PUSCH signaling is within an RB and the PTRS subcarrier is adjacent to one or more subcarriers allocated to the PUSCH in that RB.

The term "signaling" used herein may comprise any of: high-layer signaling (e.g., via Radio Resource Control (RRC) or a like), lower-layer signaling (e.g., via a physical control channel or a broadcast channel), or a combination thereof. The signaling may be implicit or explicit. The signaling may further be unicast, multicast or broadcast. The signaling may also be directly to another node or via a third node.

The term "radio measurement" or "estimation" used herein may refer to any measurement performed on radio signals. Radio measurements can be absolute or relative. Radio measurement may be called as signal level which may be signal quality and/or signal strength. Radio measurements can be e.g. intra-frequency, inter-frequency, inter-RAT measurements, CA measurements, etc. Radio measurements can be unidirectional (e.g., DL or UL) or bidirectional (e.g., Round Trip Time (RTT), Receive-Transmit (Rx-Tx), etc.). Some examples of radio measurements: timing measurements (e.g., Time of Arrival (TOA), timing advance, RTT, Reference Signal Time Difference (RSTD), Rx-Tx, propagation delay, etc.), angle measurements (e.g., angle of arrival), power-based measurements (e.g., received signal power, Reference Signals Received Power (RSRP), received signal quality, Reference Signals Received Quality (RSRQ), Signal-to-interference-plus-noise Ratio (SINR), Signal Noise Ratio (SNR), interference power, total interference plus noise, Received Signal Strength Indicator (RSSI), noise power, etc.), cell detection or cell identification, radio link monitoring (RLM), system information (SI) reading, etc. The inter-frequency and inter-RAT measurements are carried out by the WD in measurement gaps unless the WD is capable of doing such measurement without gaps. Examples of measurement gaps are measurement gap id #0 (each gap of 6 ms occurring every 40 ms), measurement gap id #1 (each gap of 6 ms occurring every 80 ms), etc. The measurement gaps are configured at the WD by the network node.

A channel may generally be a logical, transport or physical channel. A channel may comprise and/or be arranged on one or more carriers, in particular a plurality of subcarriers. A channel carrying and/or for carrying control signaling/control information may be considered a control channel, in particular if it is a physical layer channel and/or if it carries control plane information. Analogously, a channel carrying and/or for carrying data signaling/user information may be considered a data channel, in particular if it is a physical layer channel and/or if it carries user plane information. A channel may be defined for a specific communication direction, or for two complementary communication directions (e.g., UL and DL, or sidelink in two directions), in which case it may be considered to have at least two component channels, one for each direction.

Transmitting in downlink may pertain to transmission from the network or network node to the terminal. The terminal may be considered the WD or UE. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Configuring a Radio Node

Configuring a radio node, in particular a terminal or user equipment or the WD, may refer to the radio node being adapted or caused or set and/or instructed to operate according to the configuration. Configuring may be done by another device, e.g., a network node (for example, a radio node of the network like a base station or gNodeB) or network, in which case it may comprise transmitting configuration data to the radio node to be configured. Such configuration data may represent the configuration to be configured and/or comprise one or more instruction pertaining to a configuration, e.g. a configuration for transmitting and/or receiving on allocated resources, in particular frequency resources, or e.g., configuration for performing certain measurements on certain subframes or radio resources. A radio node may configure itself, e.g., based on configuration data received from a network or network node. A network node may use, and/or be adapted to use, its circuitry/ies for configuring. Allocation information may be considered a form of configuration data. Configuration data may comprise and/or be represented by configuration information, and/or one or more corresponding indications and/or message/s.

Configuring in General

Generally, configuring may include determining configuration data representing the configuration and providing, e.g. transmitting, it to one or more other nodes (parallel and/or sequentially), which may transmit it further to the radio node (or another node, which may be repeated until it reaches the wireless device). Alternatively, or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal (e.g. WD) may comprise scheduling downlink and/or uplink transmissions for the terminal, e.g. downlink data and/or downlink control signaling and/or DCI and/or uplink control or data or communication signaling, in particular acknowledgement signaling, and/or configuring resources and/or a resource pool therefor. In particular, configuring a terminal (e.g. WD) may comprise configuring the WD to perform certain measurements on certain subframes or radio resources and reporting such measurements according to embodiments of the present disclosure.

In some embodiments, a physical channel is a channel of a physical layer that transmits a modulation symbol obtained by modulating at least one coded bit stream. An Orthogonal Frequency Division Multiple Access (OFDMA) system generates and transmits multiple physical channels according to the use of a transmission information stream or the receiver. A transmitter and a receiver should previously agree on the rule for determining for which resource elements (REs) the transmitter and receiver will arrange one physical channel during transmission on the REs, and this rule may be called 'mapping'. In other embodiments, 'mapping' may mean other things.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 10:
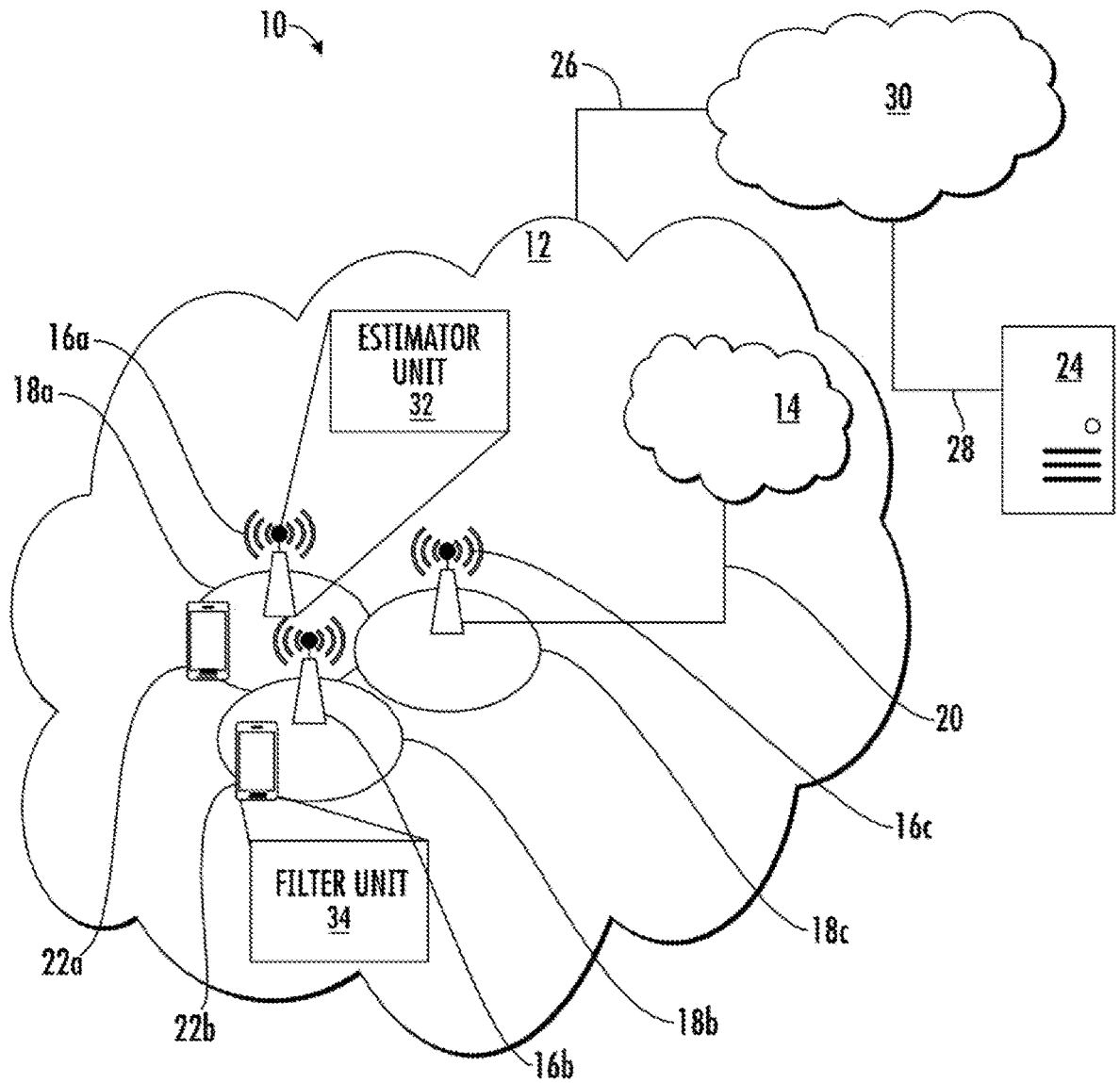
FIG. 10 is a schematic diagram of an exemplary network architecture illustrating a communication system connected via an intermediate network to a host computer according to the principles in the present disclosure.

Some embodiments provide arrangements for enabling inter carrier interference compensation for interleaved mapping from virtual to physical resource blocks. Referring again to the drawing figures, in which like elements are referred to by like reference numerals, there is shown in FIG. 10 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes (NN) 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 10 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include an estimator unit 32 which is configured to perform a de-inter-carrier-interference (de-ICI) filter estimation on a first received signal. A wireless device 22 is configured to include a filter unit 34 which is configured to apply a de-ICI filter to a second received signal (to compensate for ICD, the de-ICI filter based on the de-ICI filter estimation; and after the application of the de-ICI filter, de-map at least one physical resource block (PRB) associated with the second received signal to at least one virtual resource block (VRB) and demodulate the de-mapped second received signal.

Figure 11:
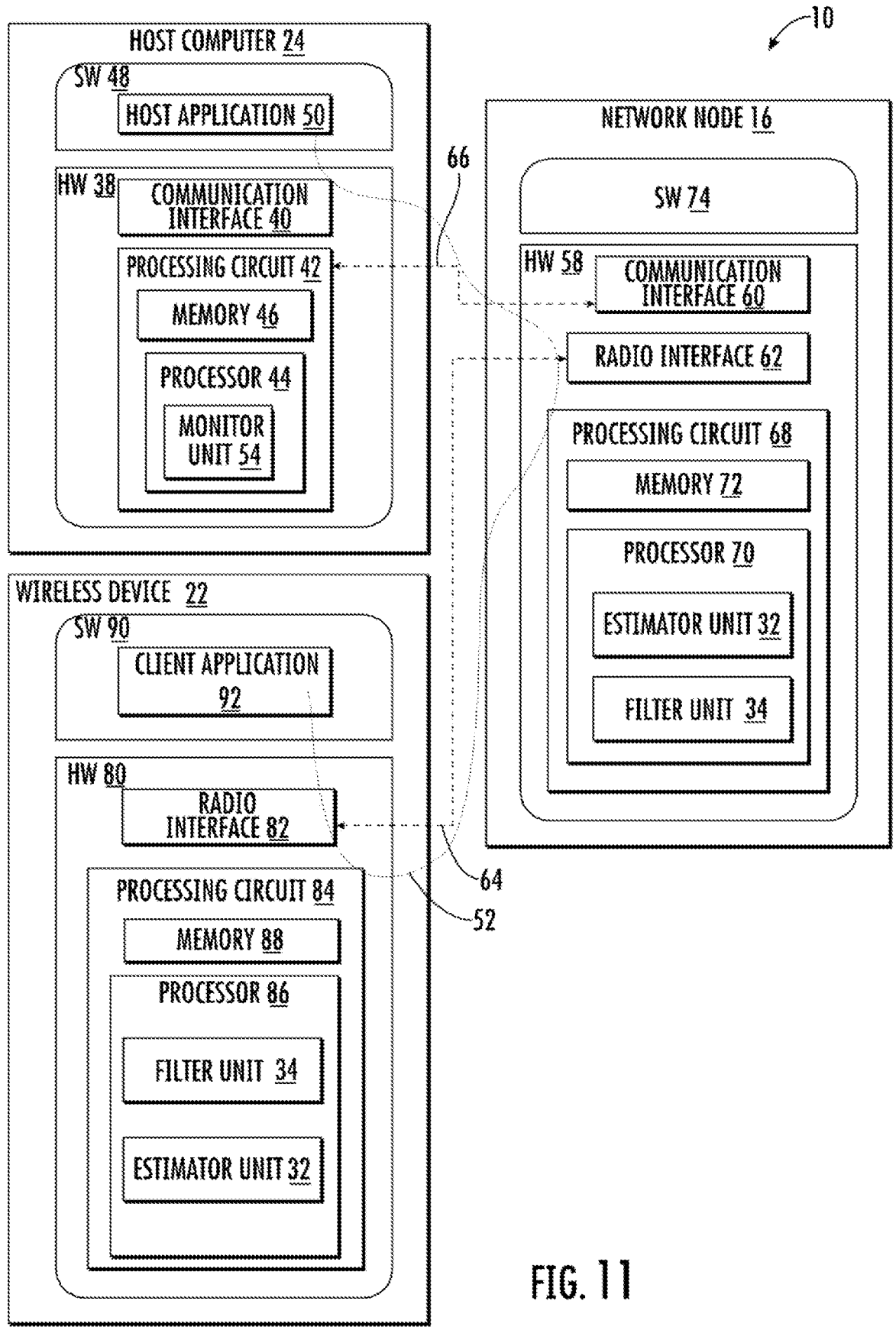
FIG. 11 is a block diagram of a host computer communicating via a network node with a wireless device over an at least partially wireless connection according to some embodiments of the present disclosure.

Although estimator unit 32 and filter unit 34 are shown in FIG. 10 on separate devices, network node (NN) 16 and WD 22, respectively; it should be understood that is these units may be used together in a receiver node (such as NN 16 and WD 22). Thus, some embodiments may include both these units at the NN 16 and/or both these units at the WD 22 (e.g., as shown in FIG. 11).

Example implementations, in accordance with an embodiment, of the WD 22, network node 16 and host computer 24 discussed in the preceding paragraphs will now be described with reference to FIG. 11. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and/or the wireless device 22. The processing circuitry 42 of the host computer 24 may include a monitor unit 54 configured to enable the service provider to observe, monitor, control, transmit to and/or receive from the network node 16 and/or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include estimator unit 32 and filter unit 34 configured to perform network node methods discussed herein, such as the methods discussed with reference to FIG. 16 as well as other figures.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include estimator unit 32 and filter unit 34 configured to perform WD methods discussed herein, such as the methods discussed with reference to FIG. 17 as well as other figures.

In some embodiments, the inner workings of the network node 16, WD 22, and host computer 24 may be as shown in FIG. 11 and independently, the surrounding network topology may be that of FIG. 10.

In FIG. 11, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 10 and 11 show various "units" such as estimator unit 32, and filter unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 12 is a flowchart illustrating an exemplary method implemented in a communication system, such as, for example, the communication system of FIGS. 10 and 11, in accordance with one embodiment. The communication system may include a host computer 24, a network node 16 and a WD 22, which may be those described with reference to FIG. 11. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 13 is a flowchart illustrating an exemplary method implemented in a communication system, such as, for example, the communication system of FIG. 10, in accordance with one embodiment. The communication system may include a host computer 24, a network node 16 and a WD 22, which may be those described with reference to FIGS. 10 and 11. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

FIG. 14 is a flowchart illustrating an exemplary method implemented in a communication system, such as, for example, the communication system of FIG. 10, in accordance with one embodiment. The communication system may include a host computer 24, a network node 16 and a WD 22, which may be those described with reference to FIGS. 10 and 11. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 15 is a flowchart illustrating an exemplary method implemented in a communication system, such as, for example, the communication system of FIG. 10, in accordance with one embodiment. The communication system may include a host computer 24, a network node 16 and a WD 22, which may be those described with reference to FIGS. 10 and 11. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 16:
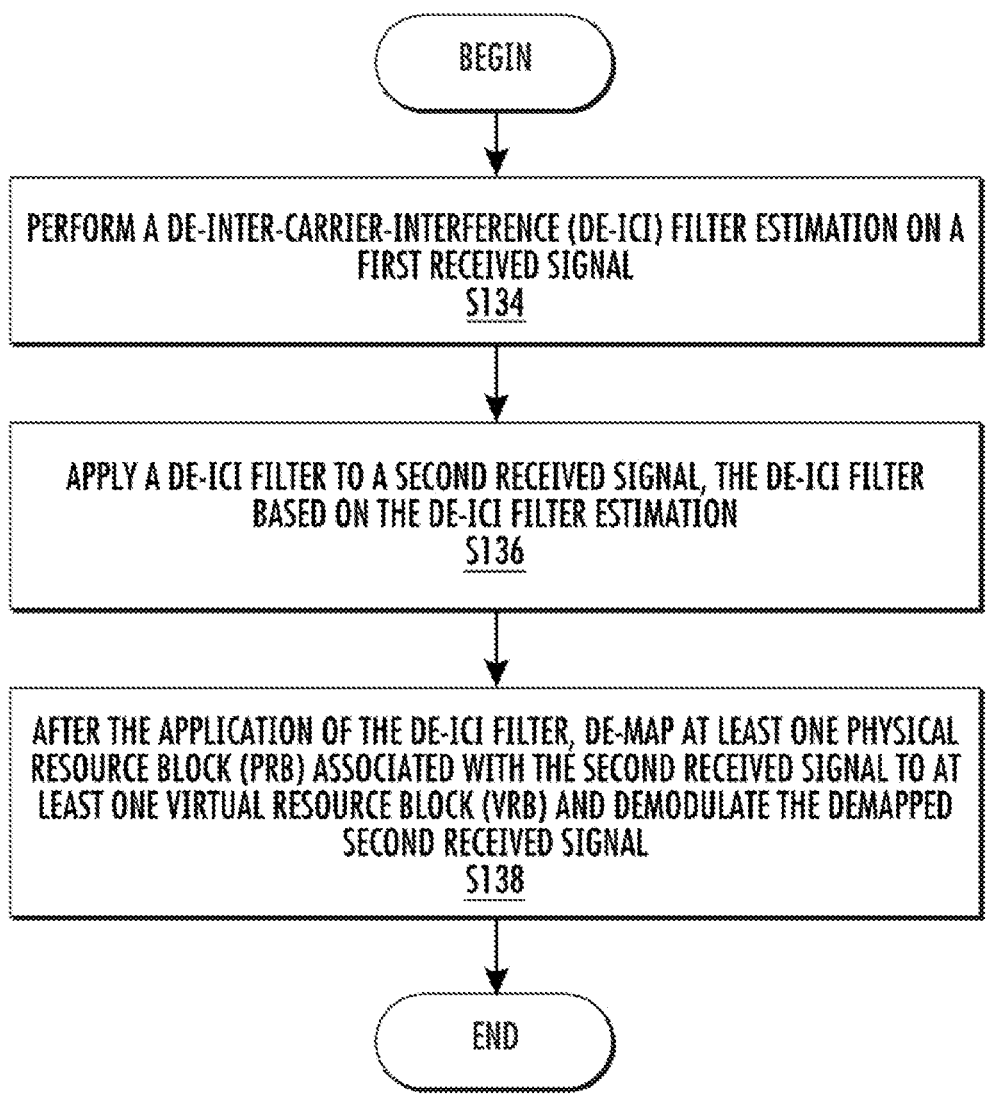
FIG. 16 is a flowchart of an exemplary process in a network node according to some embodiments of the present disclosure.

FIG. 16 is a flowchart of an exemplary process in a network node 16 according to some embodiments of the present disclosure. One or more Blocks and/or functions and/or methods performed by the network node 16 may be performed by one or more elements of network node 16 such as by estimator unit 32 and filter unit 34 in processing circuitry 68, processor 70, radio interface 62, etc. according to the example method. The example method includes performing (Block S134), such as via estimator unit 32, filter unit 34, processing circuitry 68, processor 70 and/or radio interface 62, a de-inter-carrier-interference (de-ICI) filter estimation on a first received signal. The method includes applying (Block S136), such as via estimator unit 32, filter unit 34, processing circuitry 68, processor 70 and/or radio interface 62, a de-ICI filter to a second received signal, the de-ICI filter based on the de-ICI filter estimation. The method includes after the application of the de-ICI filter, de-mapping (Block S138), such as via estimator unit 32, filter unit 34, processing circuitry 68, processor 70 and/or radio interface 62, at least one physical resource block (PRB) associated with the second received signal to at least one virtual resource block (VRB) and demodulate the de-mapped second received signal.

In some embodiments, at least one of: the first received signal comprises a demodulation reference signal (DMRS), the second received signal comprises a phase tracking reference signal (PTRS), the second received signal comprises interleaved VRB-to-PRB mapping and at least one of the first and second received signal is received on a physical uplink shared channel (PUSCH). In some embodiments, the method further includes receiving a configuration associated with at least one of the first signal and the second signal.

Figure 17:
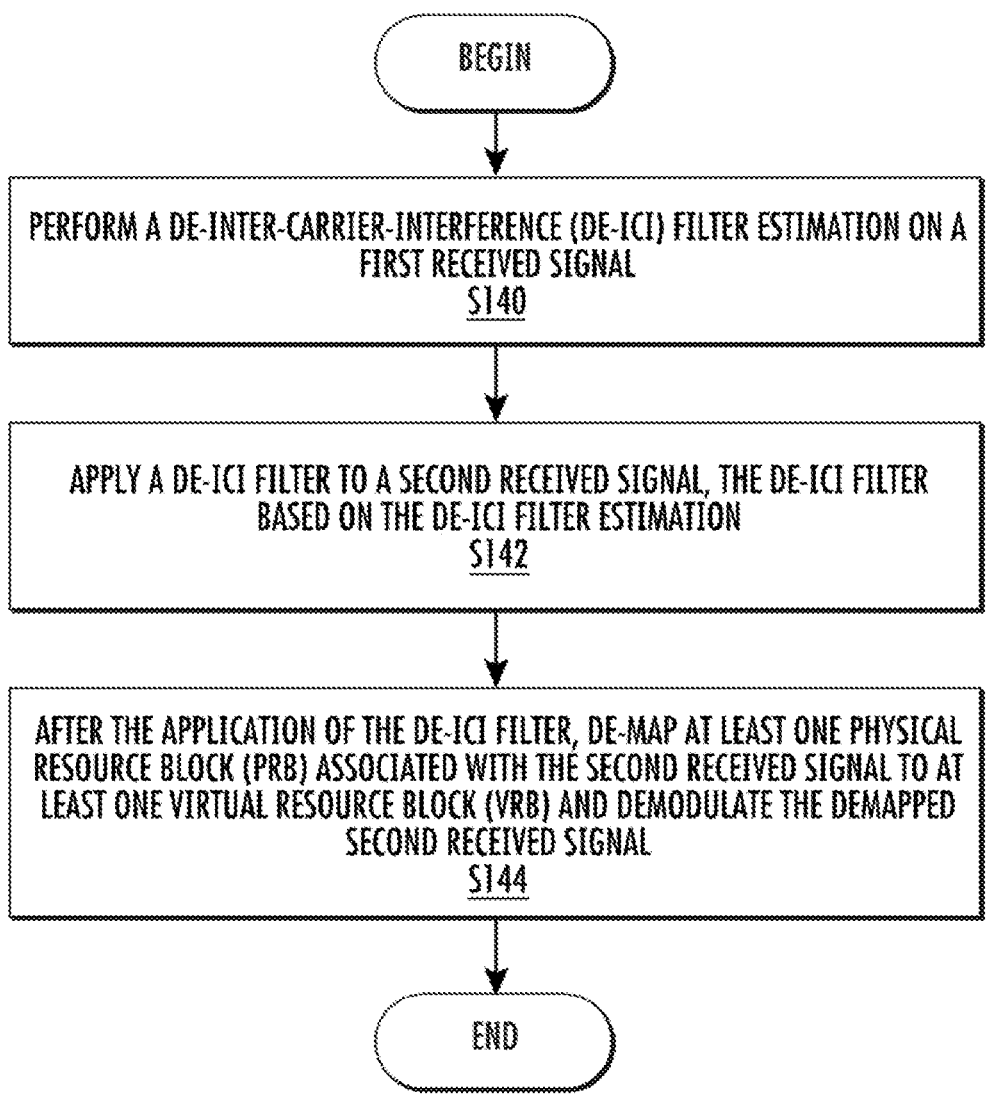
FIG. 17 is a flowchart of an exemplary process in a wireless device according to some embodiments of the present disclosure.

FIG. 17 is a flowchart of an exemplary process in a wireless device 22 according to some embodiments of the present disclosure. One or more Blocks and/or functions and/or methods performed by WD 22 may be performed by one or more elements of WD 22 such as by estimator unit 32 and filter unit 34 in processing circuitry 84, processor 86, radio interface 82, etc. The example method includes performing (Block S140), such as via estimator unit 32, filter unit 34, processing circuitry 84, processor 86 and/or radio interface 82, a de-inter-carrier-interference (de-ICI) filter estimation on a first received signal. The method includes applying (Block S142), such as via estimator unit 32, filter unit 34, processing circuitry 84, processor 86 and/or radio interface 82, a de-ICI filter to a second received signal, the de-ICI filter based on the de-ICI filter estimation. The method includes after the application of the de-ICI filter, de-mapping (Block S144), such as via estimator unit 32, filter unit 34, processing circuitry 84, processor 86 and/or radio interface 82, at least one physical resource block (PRB) associated with the second received signal to at least one virtual resource block (VRB) and demodulate the de-mapped second received signal.

In some embodiments, at least one of: the first received signal comprises a demodulation reference signal (DMRS), the second received signal comprises a phase tracking reference signal (PTRS), the second received signal comprises interleaved VRB-to-PRB mapping and at least one of the first and second received signal is received on a physical downlink shared channel (PDSCH). In some embodiments, the method further includes receiving a configuration associated with at least one of the first signal and the second signal.

Figure 18:
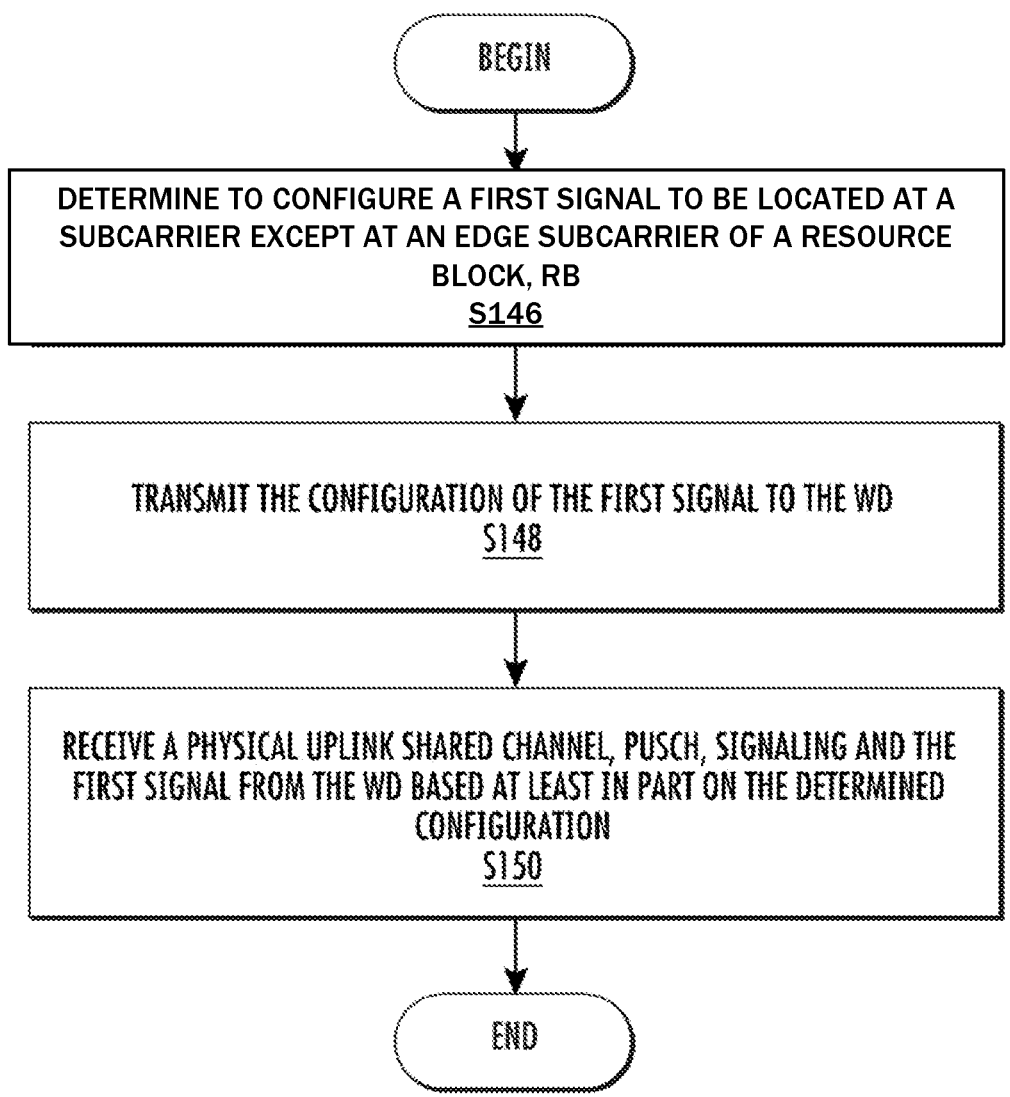
FIG. 18 is a flowchart of another exemplary process in a network node according to some embodiments of the present disclosure.

FIG. 18 is a flowchart of an exemplary process in a network node 16 according to some embodiments of the present disclosure. One or more Blocks and/or functions and/or methods performed by the network node 16 may be performed by one or more elements of network node 16 such as by estimator unit 32 and filter unit 34 in processing circuitry 68, processor 70, radio interface 62, etc. according to the example method. The example method includes determining (Block S146), as by estimator unit 32 and filter unit 34 in processing circuitry 68, processor 70 and/or radio interface 62, to configure the first signal to be located at a subcarrier except at an edge subcarrier of a resource block, RB. The method includes transmitting (Block S148), as by estimator unit 32 and filter unit 34 in processing circuitry 68, processor 70 and/or radio interface 62, the configuration of the first signal to the WD. The method includes receiving (Block S150), as by estimator unit 32 and filter unit 34 in processing circuitry 68, processor 70 and/or radio interface 62, a physical uplink shared channel, PUSCH, signaling and the first signal from the WD based at least in part on the determined configuration.

In some embodiments, the first signal comprises a phase tracking reference signal, PTRS, received by the network node. In some embodiments, the PUSCH signaling is in a subcarrier that is adjacent to the subcarrier of the PTRS. In some embodiments, the PUSCH signaling is configured with one of a frequency domain resource allocation Type 0 and Type 2. In some embodiments, the determining to configure the first signal to be located at the subcarrier except at the edge subcarrier of the RB comprises determining, as by estimator unit 32 and filter unit 34 in processing circuitry 68, processor 70 and/or radio interface 62, at least one of a demodulation reference signal, DMRS, port number and a resource element offset to configure the subcarrier location of the PTRS within the RB, $k_{ref}^{RE}$, to be unequal to an edge subcarrier location within the RB. In some embodiments, the edge subcarrier location within the RB corresponds to $k_{ref}^{RE}$ of 0 or 11. In some embodiments, the determining, as by estimator unit 32 and filter unit 34 in processing circuitry 68, processor 70 and/or radio interface 62, to configure the first signal to be located at the subcarrier except at the edge subcarrier is based at least in part on a demodulation reference signal, DMRS, configuration type used for the first signal.

Figure 19:
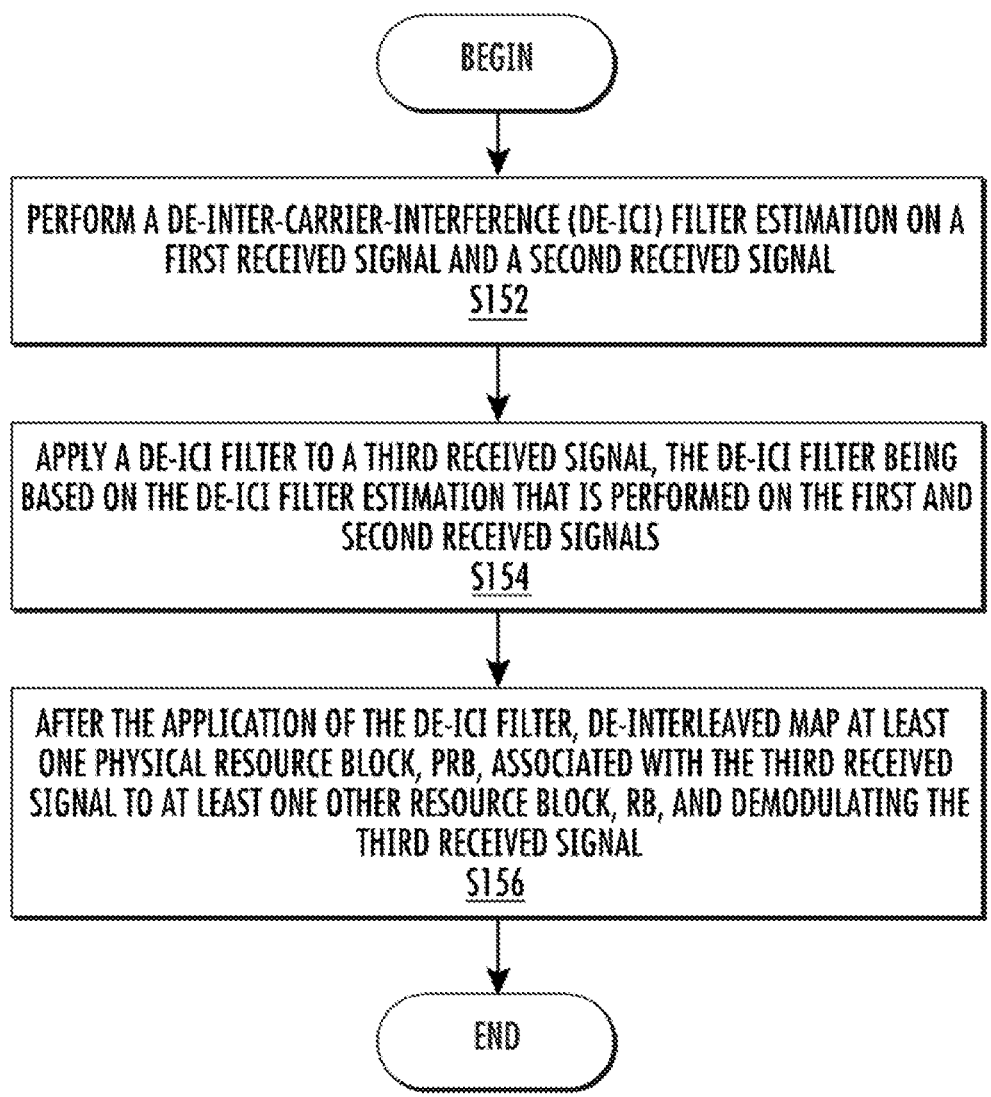
FIG. 19 is a flowchart of another exemplary process in a wireless device according to some embodiments of the present disclosure.

FIG. 19 is a flowchart of an exemplary process in a wireless device 22 according to some embodiments of the present disclosure. One or more Blocks and/or functions and/or methods performed by WD 22 may be performed by one or more elements of WD 22 such as by estimator unit 32 and filter unit 34 in processing circuitry 84, processor 86, radio interface 82, etc. The example method includes performing (Block S152), such as by estimator unit 32 and filter unit 34 in processing circuitry 84, processor 86 and/or radio interface 82, a de-inter-carrier-interference (de-ICI) filter estimation on a first received signal and a second received signal. The method includes applying (Block S154), such as by estimator unit 32 and filter unit 34 in processing circuitry 84, processor 86 and/or radio interface 82, a de-ICI filter to a third received signal, the de-ICI filter being based on the de-ICI filter estimation that is performed on the first and second received signals. The method includes after the application of the de-ICI filter, de-interleaved mapping (Block S156), such as by estimator unit 32 and filter unit 34 in processing circuitry 84, processor 86 and/or radio interface 82, at least one physical resource block, PRB, associated with the third received signal to at least one other resource block, RB, and demodulating, such as by estimator unit 32 and filter unit 34 in processing circuitry 84, processor 86 and/or radio interface 82, the third received signal.

In some embodiments, the first received signal comprises a phase tracking reference signal, PTRS, received by the WD. In some embodiments, the method further comprises receiving a configuration for the PTRS to be located at a subcarrier except at an edge subcarrier of a resource block, RB. In some embodiments, the second received signal comprises a physical downlink shared channel, PDSCH, signaling that is adjacent to the subcarrier of the PTRS. In some embodiments, the third received signal comprises a physical downlink shared channel, PDSCH, signaling. In some embodiments, the de-interleaved mapping comprises mapping from physical resource blocks, PRBs, to virtual resource blocks, VRBs.

Having described the general process flow of arrangements of the disclosure and having provided examples of hardware and software arrangements for implementing the processes and functions of the disclosure, the sections below provide details and examples of arrangements for enabling inter carrier interference compensation for interleaved mapping from virtual to physical resource blocks, which may be implemented by the network node 16, wireless device 22 and/or host computer 24.

Figure 20:
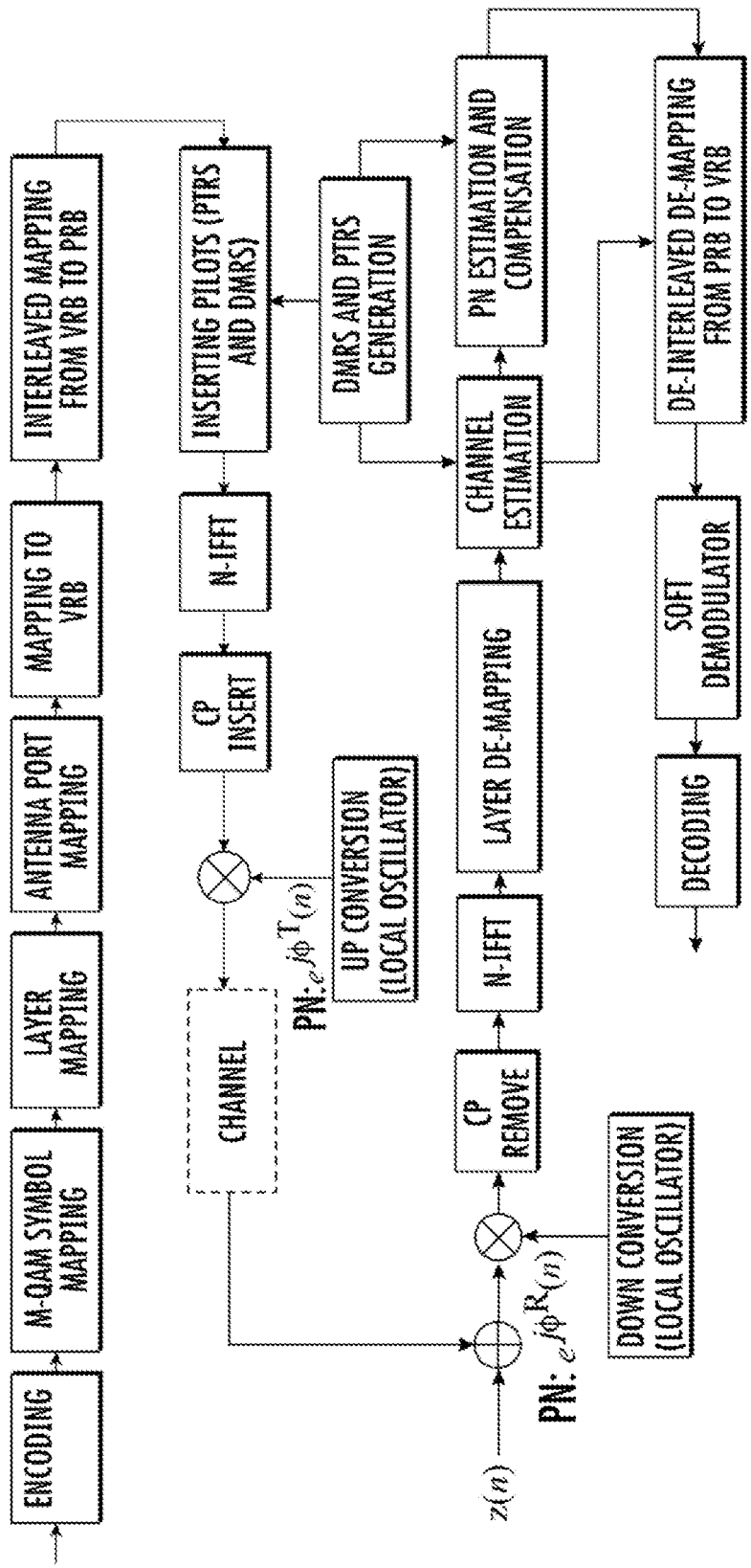
FIG. 20 illustrates an example simplified block diagram of Tx-Rx chain which enables ICI compensation for interleaved VRB-to-PRB mapping according to some embodiments of the present disclosure.

Some embodiments of the present disclosure enable ICI compensation for interleaved VRB-to-PRB mapping. In some embodiments, in order to remove the effect of ICI caused by phase noise or by other impairments, such as those related to frequency misalignment (e.g., frequency offset or Doppler), de-ICI filter estimation and ICI compensation may be performed before de-interleaved de-mapping from VRB-to-PRB. FIG. 20 illustrates an example simplified block diagram of a Tx-Rx chain with ICI compensation for interleaved VRB-to-PRB mapping. Some embodiments of the present disclosure further provide for proper configuration of transmissions using resource allocation type 2. Some embodiments of the present disclosure may advantageously enable implementation of ICI compensation for interleaved VRB-to-PRB mapping.

Embodiment 1: Receiver for Transmission with VRB-to-PRB Mapping

Some embodiments of the present disclosure may enable ICI compensation for interleaved VRB-to-PRB mapping. For ICI compensation, the received signal $\{R_k\}$ is filtered by de-ICI filter and then fed to the OFDM demodulator, i.e., $$R'_k = \sum_{m=-u}^{u} a_m R_{k-m},$$

where $\{\hat{a}_{-u}, \hat{a}_{-u+1}, \ldots, \hat{a}_u\}$ are coefficients of de-ICI filter. As discussed in above, to proceed with estimating the de-ICI filter, the method may include collecting the received signals at and around the PTRS. Formally, in some embodiments, the $R_u$ matrix, which is collection of the received signals at and around the PTRS, may be defined as:

$$R_u \triangleq \begin{bmatrix} R_{k_0+u} & R_{k_0+u-1} & \cdots & R_{k_0-u} \\ R_{k_1+u} & R_{k_1+u-1} & \cdots & R_{k_1-u} \\ \vdots & \vdots & \ddots & \vdots \\ R_{k_{N-1}+u} & R_{k_{N-1}+u-1} & \cdots & R_{k_{N-1}-u} \end{bmatrix}.$$

Each row of the $R_u$ matrix collects the received PTRS $R_{k_i}$ and its adjacent received signals $R_{k_i-u}$ to $R_{k_i+u}$ in the adjacent subcarriers. For interleaved mapping from VRB-to-PRB, the adjacent received signal to PTRS may be rearranged after de-interleaving, which can make ICI compensation challenging.

Figure 21:
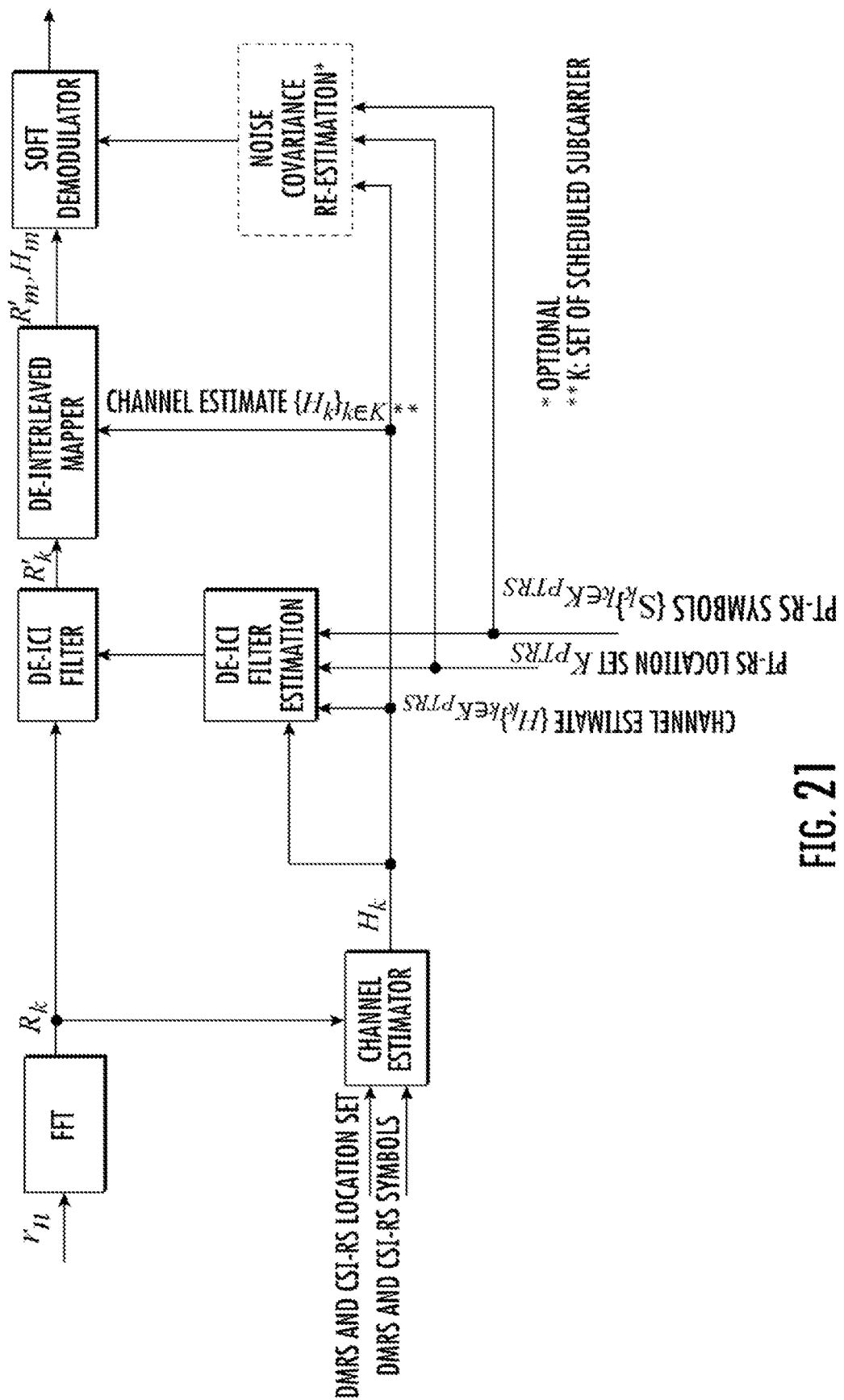
FIG. 21 illustrates an example schematic diagram illustrating phase-noise ICI compensation method when interleaved VRB-to-PRB mapping is enabled according to some embodiments of the present disclosure.

In some embodiments, e.g., to resolve this issue, some embodiment may include performing ICI estimation and compensation (e.g., by receiver at NN 16 and/or WD 22, such as radio interface 62, processing circuitry 68 and/or radio interface 82, processing circuitry 84) before de-interleaved mapping. FIG. 21 shows a schematic diagram of an embodiment of a phase-noise ICI compensation method and/or arrangement at the receiver (e.g., by receiver at NN 16 and/or WD 22, such as radio interface 62, processing circuitry 68 and/or radio interface 82, processing circuitry 84) when interleaved VRB-to-PRB mapping is enabled. The set of subcarrier indices carrying PTRS is denoted as $K_{PTRS}$ in FIG. 21.

To Enable ICI Compensation in the Receiver, the Following Example Steps May Be Performed Step 1: Channel estimator estimates the channel based on the received signal on demodulation reference signal (DMRS) and other reference symbols. The channel estimation information may be used for estimating a De-ICI filter.

Step 2: A de-ICI filter coefficients â is computed based on at least the channel estimates and PTRS values over the PTRS subcarriers and the received signals over the PTRS subcarriers and their adjacent subcarriers.

Step 3: The received signal $R_k'$ is filtered by the de-ICI filtered â to suppress ICI.

Step 4: Optionally, the receiver can (re-)estimate the noise variance $\hat{\sigma}_w^2$ using the filtered signal $R_k'$ over the PTRS locations in $K_{PTRS}$ and the corresponding channel estimate $\{H_k\}_{k \in K_{PTRS}}$ and PTRS symbols $\{S_k\}_{k \in K_{PTRS}}$. The updated noise variance $\hat{\sigma}_w^2$ can be used to improve the accuracy of log-likelihood ratio (LLR) computation in the demodulator.

Step 5: Physical RBs may be de-mapped to virtual RBs according to a specified de-interleaved mapping method, and then fed to the soft demodulator.

Embodiment 2: Configuration for Resource Allocation Type 2 Transmissions

In the current NR technical specifications (TS) 38.211, the PTRS subcarrier location within an RB is given by the parameter $k_{ref}^{RE}$, which is in turn determined by two higher-layer configurable parameters:

First parameter is the DMRS port number $\tilde{p}$ associated with the PTRS port.

Second parameter is resourceElementOffset, which has four possible values. When this parameter is explicitly configured by higher-layer signaling, a default value of "offset00" is used.

With these two higher-layer configurable parameters, the exact value of the PTRS subcarrier location within an RB, $k_{ref}^{RE}$, can be read off from a look up table shown below (reproduced from NR Technical Specification (TS) 38.211):

TABLE 6.4.1.2.2.1-1

The parameter $k_{ref}^{RE}$.

| DMRS antenna port $\tilde{p}$ | $k_{ref}^{RE}$ | | | | | | | |
|---|---|---|---|---|---|---|---|---|
| | DMRS Configuration type 1 resourceElementOffset | | | | DMRS Configuration type 2 resourceElementOffset | | | |
| | offset 00 | offset 01 | offset 10 | offset 11 | offset 00 | offset 01 | offset 10 | offset 11 |
| 0 | 0 | 2 | 6 | 8 | 0 | 1 | 6 | 7 |
| 1 | 2 | 4 | 8 | 10 | 1 | 6 | 7 | 0 |
| 2 | 1 | 3 | 7 | 9 | 2 | 3 | 8 | 9 |
| 3 | 3 | 5 | 9 | 11 | 3 | 8 | 9 | 2 |
| 4 | — | — | — | — | 4 | 5 | 10 | 11 |
| 5 | — | — | — | — | 5 | 10 | 11 | 4 |

According to some embodiments of the present disclosure, the network (e.g., NN 16) may use higher-layer signaling (e.g., radio resource control signaling) to configure the PUSCH transmission nodes (e.g., WDs 22) such that the PTRS is not always located at the edge of an RB. That is, the cases in the above look up table 6.4.1.2.2.1-1 with $k_{ref}^{RE}=0$ or $k_{ref}^{RE}=11$ may be avoided.

As a first nonlimiting example embodiment, if the higher-layer parameter resourceElementOffset is not explicitly configured, then the network (e.g., NN 16) may configure the PTRS port to be associated with DMRS port 1, 2 or 3 for DMRS Configuration type 1 or DMRS Configuration type 2.

As another nonlimiting example embodiment, in case of DMRS Configuration type 1, the network can configure resourceElementOffset value to "offset01" or "offset10" to remove the restriction on the DRMS port that can be associated with the PTRS.

As a further nonlimiting example embodiment, in case of DMRS Configuration type 2, the network can configure resourceElementOffset value to "offset01" to remove the restriction on the DRMS port that can be associated with the PTRS.

Some embodiments of the present disclosure may provide arrangements that may enable ICI compensation for interleaved VRB-to-PRB mapping.

Some embodiments may include one or more of the following:

Embodiment A1. A network node configured to communicate with a wireless device (WD), the network node configured to, and/or comprising a radio interface and/or comprising processing circuitry configured to:
perform a de-inter-carrier-interference (de-ICI) filter estimation on a first received signal;
apply a de-ICI filter to a second received signal, the de-ICI filter based on the de-ICI filter estimation; and
after the application of the de-ICI filter, de-map at least one physical resource block (PRB) associated with the second received signal to at least one virtual resource block (VRB) and demodulate the de-mapped second received signal.

Embodiment A2. The network node of Embodiment A1, wherein at least one of:
the first received signal comprises a demodulation reference signal (DMRS), the second received signal comprises a phase tracking reference signal (PTRS), the second received signal comprises interleaved VRB-to-PRB mapping and at least one of the first and second received signal is received on a physical uplink shared channel (PUSCH).

Embodiment A3. The network node of any one of Embodiments A1 and A2, wherein the network node and/or the processing circuitry and/or the radio interface is configured to cause the network node to:
send a configuration associated with at least one of the first signal and the second signal.

Embodiment B1. A method implemented in a network node, the method comprising:
performing a de-inter-carrier-interference (de-ICI) filter estimation on a first received signal;
applying a de-ICI filter to a second received signal, the de-ICI filter based on the de-ICI filter estimation; and
after the application of the de-ICI filter, de-mapping at least one physical resource block (PRB) associated with the second received signal to at least one virtual resource block (VRB) and demodulate the de-mapped second received signal.

Embodiment B2. The method of Embodiment B1, wherein at least one of:
the first received signal comprises a demodulation reference signal (DMRS), the second received signal comprises a phase tracking reference signal (PTRS), the second
received signal comprises interleaved VRB-to-PRB mapping and at least one of the first and second received signal is received on a physical uplink shared channel (PUSCH).

Embodiment B3. The method of any one of Embodiments B1 and B2, further comprising:
receiving a configuration associated with at least one of the first signal and the second signal.

Embodiment C1. A wireless device (WD) configured to communicate with a network node, the WD configured to, and/or comprising a radio interface and/or processing circuitry configured to:
perform a de-inter-carrier-interference (de-ICI) filter estimation on a first received signal;
apply a de-ICI filter to a second received signal, the de-ICI filter based on the de-ICI filter estimation; and
after the application of the de-ICI filter, de-map at least one physical resource block (PRB) associated with the second received signal to at least one virtual resource block (VRB) and demodulate the de-mapped second received signal.

Embodiment C2. The WD of Embodiment C1, wherein at least one of:
the first received signal comprises a demodulation reference signal (DMRS), the second received signal comprises a phase tracking reference signal (PTRS), the second received signal comprises interleaved VRB-to-PRB mapping and at least one of the first and second received signal is received on a physical downlink shared channel (PDSCH).

Embodiment C3. The WD of any one of Embodiments C1 and C2, wherein the WD and/or the processing circuitry and/or the radio interface is configured to cause the WD to:
  receive a configuration associated with at least one of the first signal and the second signal.

Embodiment D1. A method implemented in a wireless device (WD), the method comprising:
  performing a de-inter-carrier-interference (de-ICI) filter estimation on a first received signal;
  applying a de-ICI filter to a second received signal, the de-ICI filter based on the de-ICI filter estimation; and
  after the application of the de-ICI filter, de-mapping at least one physical resource block (PRB) associated with the second received signal to at least one virtual resource block (VRB) and demodulate the de-mapped second received signal.

Embodiment D2. The method of Embodiment D1, wherein at least one of:
  the first received signal comprises a demodulation reference signal (DMRS), the second received signal comprises a phase tracking reference signal (PTRS), the second received signal comprises interleaved VRB-to-PRB mapping and at least one of the first and second received signal is received on a physical downlink shared channel (PDSCH).

Embodiment D3. The method of any one of Embodiments D1 and D2, further comprising:
  receiving a configuration associated with at least one of the first signal and the second signal.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

| Abbreviation | Explanation |
| --- | --- |
| BWP | Bandwidth part |
| CPE | Common phase error |
| DMRS | Demodulation reference signal |
| eMBB | Enhanced mobile broadband |
| FR1 | Frequency range 1 as defined in [8, TS 38.104] |
| FR2 | Frequency range 2 as defined in [8, TS 38.104] |
| ICI | Inter-carrier interference |
| LLR | Log likelihood ratio |
| MTC | Machine type communication |
| NR | New radio |
| OFDM | Orthogonal Frequency Division Multiplexing |

| Abbreviation | Explanation |
| --- | --- |
| PDCCH | Physical downlink control channel |
| PDSCH | Physical downlink shared channel |
| PN | Phase noise |
| PRB | Physical resource block |
| PSD | Power spectral density |
| PTRS | Phase-tracking reference signal |
| RS | Reference signal |
| SCS | Subcarrier spacings |
| URLLC | Ultra-reliable and low latency communication |

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method implemented in a wireless device, WD, configured to communicate with a network node, the method comprising:
performing a de-inter-carrier-interference, de-ICI, filter estimation on a first received signal and a second received signal;
applying a de-ICI filter to a third received signal, the de-ICI filter being based on the de-ICI filter estimation that is performed on the first and second received signals; and
after the application of the de-ICI filter, de-interleaved mapping at least one physical resource block, PRB, associated with the third received signal to at least one other resource block, RB, and demodulating the third received signal, the de-interleaved mapping including mapping from physical resource blocks, PRBs, to virtual resource blocks, VRBs.

2. The method of claim 1, wherein the first received signal comprises a phase tracking reference signal, PTRS, received by the WD.

3. The method of claim 2, further comprising:
receiving a configuration for the PTRS to be located at a subcarrier except at an edge subcarrier of a resource block, RB.

4. The method of claim 3, wherein the second received signal comprises a physical downlink shared channel, PDSCH, signaling that is adjacent to the subcarrier of the PTRS.

5. The method of claim 1, wherein the third received signal comprises a physical downlink shared channel, PDSCH, signaling.

6. A wireless device, WD, configured to communicate with a network node, the WD comprising processing circuitry, the processing circuitry configured to cause the WD to:
perform a de-inter-carrier-interference, de-ICI, filter estimation on a first received signal and a second received signal;
apply a de-ICI filter to a third received signal, the de-ICI filter being based on the de-ICI filter estimation that is performed on the first and second received signals; and
after the application of the de-ICI filter, de-interleaved map at least one physical resource block, PRB, associated with the third received signal to at least one other resource block, RB, and demodulating the third received signal, the de-interleaved mapping including mapping from physical resource blocks, PRBs, to virtual resource blocks, VRBs.

7. The WD of claim 6, wherein the processing circuitry is configured to cause the WD to:
receive a configuration for a phase tracking reference signal, PTRS, to be located at a subcarrier except at an edge subcarrier of a resource block, RB.

8. The WD of claim 7, wherein the second received signal comprises a physical downlink shared channel, PDSCH, signaling that is adjacent to the subcarrier of the PTRS.

9. The WD of claim 6, wherein the third received signal comprises a physical downlink shared channel, PDSCH, signaling.

* * * * *